US012463343B2

(12) United States Patent
Sampo

(10) Patent No.: US 12,463,343 B2
(45) Date of Patent: Nov. 4, 2025

(54) ANTENNA HAVING FIRST AND SECOND CONDUCTOR PARTS WITH SLEEVES

(71) Applicant: YOKOWO CO., LTD., Tokyo (JP)

(72) Inventor: Takeshi Sampo, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 2 days.

(21) Appl. No.: 18/280,684

(22) PCT Filed: Feb. 24, 2022

(86) PCT No.: PCT/JP2022/007557
§ 371 (c)(1),
(2) Date: Sep. 7, 2023

(87) PCT Pub. No.: WO2022/190876
PCT Pub. Date: Sep. 15, 2022

(65) Prior Publication Data
US 2024/0154316 A1 May 9, 2024

Related U.S. Application Data

(60) Provisional application No. 63/158,010, filed on Mar. 8, 2021.

(51) Int. Cl.
*H01Q 9/06* (2006.01)
*H01Q 13/26* (2006.01)

(52) U.S. Cl.
CPC ............. *H01Q 9/065* (2013.01); *H01Q 13/26* (2013.01)

(58) Field of Classification Search
CPC .. H01Q 1/48; H01Q 1/38; H01Q 9/40; H01Q 5/00
See application file for complete search history.

(56) References Cited

U.S. PATENT DOCUMENTS 6,337,666 B1 * 1/2002 Bishop ..................... H01Q 9/40 343/702
6,765,539 B1 * 7/2004 Wang ..................... H01Q 21/30 343/700 MS
7,106,258 B2 * 9/2006 Kuramoto .............. H01Q 21/30 343/795
7,339,542 B2 * 3/2008 Lalezari ................... H01Q 9/32 343/773

(Continued)

FOREIGN PATENT DOCUMENTS

JP H10-107533 A 4/1998
JP 2004-048109 A 2/2004

(Continued)

OTHER PUBLICATIONS

International Search Report and Written Opinion mailed on May 17, 2022, received for PCT Application PCT/JP2022/007557, filed on Feb. 24, 2022, 11 pages including English Translation.

(Continued)

*Primary Examiner* — Hasan Islam
(74) *Attorney, Agent, or Firm* — XSENSUS LLP

(57) ABSTRACT

An antenna comprises a substrate; and a first conductor part and a second conductor part formed on the substrate wherein the first conductor part is connected to a signal wire, the second conductor part is connected to a ground wire, and the first conductor part and the second conductor part operate as a sleeve dipole antenna.

6 Claims, 23 Drawing Sheets

(56) References Cited

U.S. PATENT DOCUMENTS

| | | | | |
|---|---|---|---|---|
| 8,314,744 | B2 * | 11/2012 | Libonati | H01Q 9/28 343/773 |
| 8,866,685 | B2 * | 10/2014 | Lee | H01Q 9/28 343/770 |
| 2005/0140553 | A1 | 6/2005 | Kuramoto | |
| 2007/0030199 | A1 * | 2/2007 | Chen | H01Q 1/48 343/901 |
| 2010/0066625 | A1 * | 3/2010 | Kazanchian | H01Q 1/405 343/793 |
| 2010/0231451 | A1 | 9/2010 | Noguchi et al. | |
| 2015/0357706 | A1 | 12/2015 | Kubo et al. | |

FOREIGN PATENT DOCUMENTS

| | | | | |
|---|---|---|---|---|
| JP | 2005-192049 | A | 7/2005 | |
| JP | 2008-078752 | A | 4/2008 | |
| JP | 2008-109214 | A | 5/2008 | |
| JP | 2014161008 | A * | 9/2014 | H01Q 1/38 |
| JP | 2019-062372 | A | 4/2019 | |

OTHER PUBLICATIONS

Office Action issued on Jul. 22, 2025, in corresponding Japanese patent Application No. 2023-505279, 6 pages.

* cited by examiner

ANTENNA HAVING FIRST AND SECOND CONDUCTOR PARTS WITH SLEEVES

CROSS-REFERENCE TO RELATED APPLICATIONS

The present application is based on PCT filing PCT/JP2022/007557, filed Feb. 24, 2022, which claims priority from U.S. Provisional Patent Application 63/158,010, filed Mar. 8, 2021, the entire contents of each are incorporated herein by reference.

TECHNICAL FIELD

The present disclosure relates to an antenna.

BACKGROUND ART

Patent Literature 1 discloses a dipole antenna that supports 2.4 GHz band radio waves.

CITATION LIST

Patent Literature

[PTL 1] Japanese Unexamined Patent Application Publication No. 2019-62372

SUMMARY OF INVENTION

Technical Problem

In the antenna of Patent Literature 1, when the size of the antenna is reduced according to demand, a leakage current may become a problem.

An example of an object of the present disclosure is to reduce the size of the antenna and suppress a leakage current. Other objects of the present disclosure will become apparent from the present specification given herein.

Solution to Problem

An aspect of the present disclosure is an antenna comprising a substrate and a first conductor part and a second conductor part formed on the substrate, wherein the first conductor part is connected to a signal wire, the second conductor part is connected to a ground wire, and the first conductor part and the second conductor part operate as a sleeve dipole antenna.

According to one aspect of the present disclosure, it is possible to reduce the size of the antenna and suppress a leakage current.

BRIEF DESCRIPTION OF DRAWINGS

FIG. 3 is a diagram of an antenna 50.

FIG. 4 is a diagram of an antenna 60.

FIG. 10 is a diagram of a line portion of an antenna 10.

FIG. 23 is a diagram of a line portion of the antenna 110.

DESCRIPTION OF EMBODIMENTS

Figure 1A:
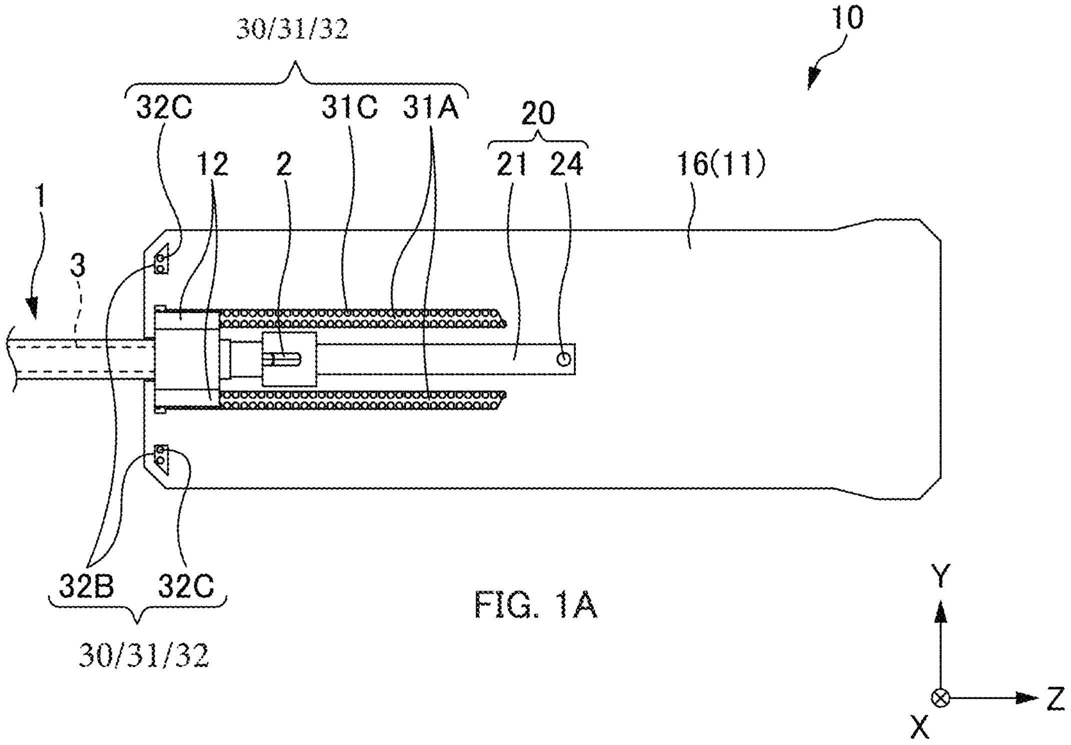
FIGS. 1A and 1B are plan views of an antenna 10 according to a first example of this embodiment, FIG. 1A illustrating a front surface side of the antenna 10 and FIG. 1B illustrating a back surface side of the antenna 10.

At least the following matters will become apparent from the description of present specification and the accompanying drawings.

Hereinafter, a preferred embodiment of the present disclosure will be described with reference to the drawings. The same or equivalent components, members, and the like illustrated in the drawings are denoted by the same reference numerals, and redundant description thereof will be omitted as appropriate.

Embodiment

Figure 1B:
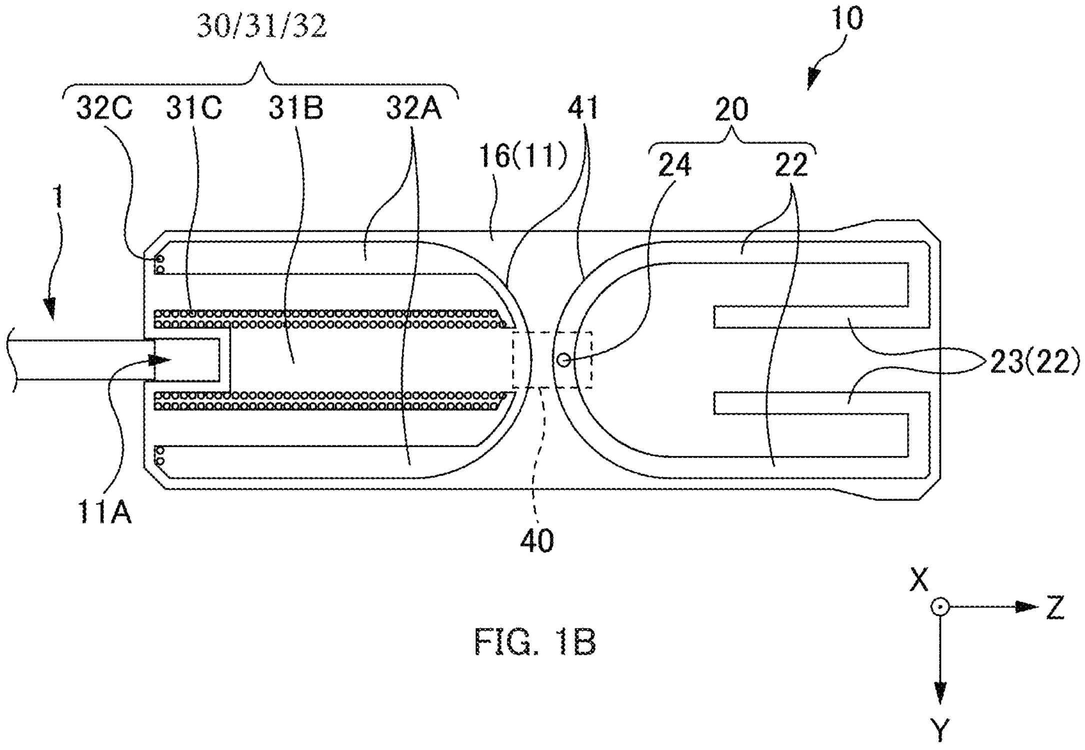
Figure 2:
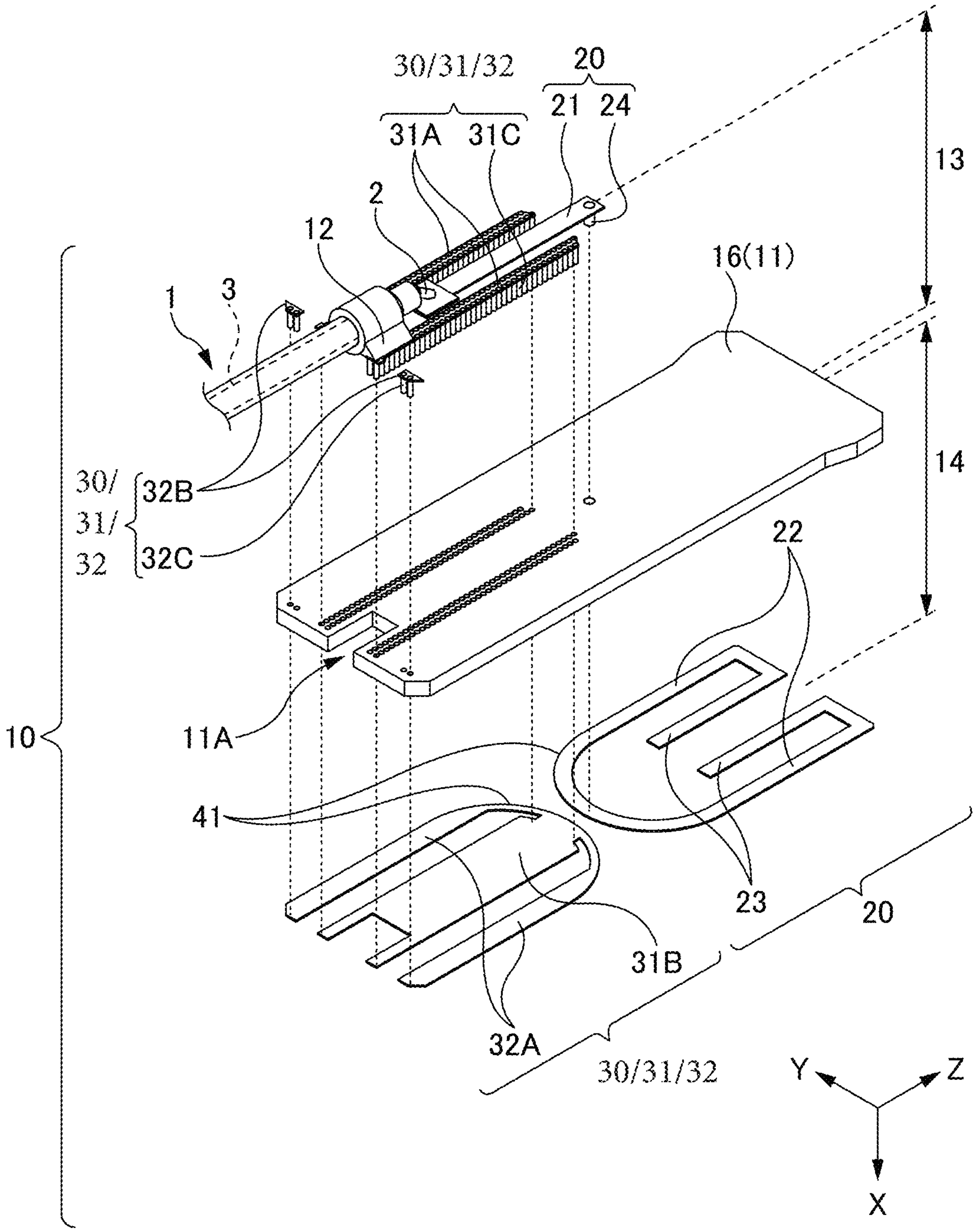
FIG. 2 is an exploded perspective view of the antenna 10.

FIG. 1 is a plan view of an antenna 10 according to a first example of this embodiment. FIG. 1A is a view of the front side of the antenna 10 and FIG. 1B is a view of the back side of the antenna 10. FIG. 2 is an exploded perspective view of the antenna 10.

<<Definition of Directions and the Like>>

First, with reference to FIGS. 1 and 2, directions (X direction, Y direction, and Z direction) and the like regarding the antenna 10 are defined.

As illustrated in FIGS. 1 and 2, a direction perpendicular to a board surface of a substrate 11 (described below) (normal direction to the board surface) is defined as the X direction. As illustrated in FIG. 2, a direction from a front surface to a back surface of the substrate 11 is defined as a +X direction, and a direction from the back surface to the front surface of the substrate 11 is defined as a −X direction. Here, one of the board surfaces of the substrate 11 where a cable connecting portion 12 is provided is referred to as the “front surface” and the surface opposite to the front surface is referred to as the “back surface”.

As illustrated in FIG. 1, a direction in which a pair of front side second line portions 31A (described below) are arranged is defined as the Y direction, and a direction in which a first line portion 21 (described below) extends is defined as the Z direction. Then, a +Y direction and a +Z direction are determined so as to form right-handed orthogonal three axes along with the +X direction described above. The −Y direction and −Z direction are defined as opposite directions to the +Y direction and +Z direction, respectively.

In FIGS. 1 and 2, each direction of the +X, +Y, and +Z directions is indicated by an arrowed line for easier understanding of the directions of the antenna 10 and the like. The point of intersection between these arrowed lines does not mean the coordinate origin.

In the antenna 10 according to this embodiment, the substrate 11 has a substantially rectangular external shape. Therefore, the Y direction may be referred to as a “width direction” and the Z direction may be referred to as a “longitudinal direction”. The Y direction is also the direction along the short side of the substrate 11, and the Z direction is also the direction along the long side of the substrate 11. Here, “substantially rectangular” is included in “substantially quadrilateral”. Also, “substantially quadrilateral” means a shape consisting of four sides, for example, and at least some of the corners may be obliquely cut away from the sides, for example. Alternatively, in the “substantially quadrilateral” shape, a notch (concave portion) or protrusion (convex portion) may be provided in some of the sides.

In the antenna 10 according to this embodiment, a coaxial cable 1 is connected along the longitudinal direction of the substrate 11 as illustrated in FIG. 1, for example. Therefore, such characteristics of the shape of the substrate 11, an extending direction of the coaxial cable 1, and the like help the understanding of the directions and the like in the antenna 10.

The definitions of directions and the like described above are common to other embodiments of the present specification unless otherwise specified.

<<Outline of Antenna 10 of First Example>>

Next, with reference to FIGS. 1 and 2, the outline of the antenna 10 according to the first example of this embodiment will be described.

The antenna 10 is a broadband antenna for mobile communications. The antenna 10 of this embodiment supports 2.4 GHz band and 5 GHz band radio waves used for Wi-Fi (registered trademark), Bluetooth (registered trademark), and the like. The antenna 10 also supports linearly polarized waves. The linearly polarized waves may also be referred to as, for example, vertically polarized waves when the polarization plane is vertical to the ground, and as horizontally polarized waves when the polarization plane is horizontal to the ground.

However, the communication standards and frequency bands supported by the antenna 10 are not limited to those described above, and may be other communication standards and frequency bands. The antenna 10 may support radio waves in at least some of the frequency bands for telematics, V2X (Vehicle to Everything: vehicle-to-vehicle communication, road-to-vehicle communication), GSM, UMTS, LTE, and 5G, for example.

The antenna 10 may also support multiple-input multiple-output (MIMO) communication. In the MIMO communication, data is transmitted from each of a plurality of antennas formed using the antenna 10, and data is received at the same time by the plurality of antennas. The antenna 10 may also be a keyless entry antenna or a smart entry antenna.

The coaxial cable 1 is connected to the antenna 10 as illustrated in FIGS. 1 and 2. The coaxial cable 1 is a feeder connected to the antenna 10. As illustrated in FIGS. 1A and 2, the coaxial cable 1 includes a signal wire 2 as an inner conductor and a ground wire 3 as an outer conductor. In FIGS. 1A and 2, the ground wire 3, covered by a sheath of the coaxial cable 1, is indicated by a dashed line. The signal wire 2 is connected to a first conductor part 20 formed on the substrate 11, while the ground wire 3 is connected to a second conductor part 30 formed on the substrate 11.

Here, “connecting” is not limited to physical connecting but includes “electrical coupling”. The “electrical coupling” includes, for example, coupling objects with conductors, electronic circuits, electronic parts, and the like.

The antenna 10 includes the substrate 11, the cable connecting portion 12, the first conductor part 20, the second conductor part 30, and a feeding portion 40.

The substrate 11 is a plate-like member on which a conductor pattern that functions as the first and second conductor parts 20 and 30 is formed. In the antenna 10 of this embodiment, the substrate 11 is a printed circuit board (PCB). In the antenna 10 of this embodiment, the substrate 11 is also a rigid substrate, but is not limited thereto and may be a flexible substrate. In addition to the conductor pattern that functions as the first and second conductor parts 20 and 30, the substrate 11 may be provided with a separate circuit element such as a filter.

The substrate 11 has a dielectric layer 16.

The dielectric layer 16 is a layer made of a dielectric material. In this embodiment, the dielectric layer 16 is formed of a dielectric material such as glass epoxy resin used for PCBs. However, the dielectric layer 16 may also be formed of a dielectric material other than glass epoxy resin, such as phenol resin.

In the antenna 10 of this embodiment, the substrate 11 is a double-sided substrate (two-layer substrate) having conductor patterns formed on both sides of one dielectric layer 16 as illustrated in FIGS. 1 and 2. However, the substrate 11 may be a single-sided substrate (one-layer substrate) having a conductor pattern formed on one side of one dielectric layer 16. Alternatively, the substrate 11 may be configured as a three-layer substrate or a multilayer substrate of four layers or more by having another dielectric layer 17 besides the dielectric layer 16, as in the case of an antenna 110 illustrated in FIGS. 21 and 22 described below.

Hereinafter, as illustrated in FIG. 2, the layer on the front surface side of the substrate 11, in which the conductor pattern and the like are formed, may be referred to as a "first layer 13". Likewise, the layer on the back surface side of the substrate 11, in which the conductor pattern and the like are formed, may be referred to as a "second layer 14".

The cable connecting portion 12 is a member for connecting the coaxial cable 1 to the antenna 10. In this embodiment, the cable connecting portion 12 is configured by a ring-shaped holding member that holds the end of the coaxial cable 1, as illustrated in FIG. 2. Then, the holding member is joined to the substrate 11 by soldering. However, the cable connecting portion 12 is not limited to the above configuration, and may be configured by a connector, for example. The cable connecting portion 12 is provided at the end of the substrate 11 on the −Z direction side. Thus, the coaxial cable 1 is connected to the end of the substrate 11.

In this embodiment, the substrate 11 has a notch portion 11A as illustrated in FIGS. 1B and 2. The notch portion 11A is a notched section of the substrate 11. The cable connecting portion 12 is located in the notch portion 11A. To be more specific, a part of the holding member that holds the end of the coaxial cable 1 is arranged inside the notch portion 11A, and both sides of the holding member in the Y direction are soldered to the edges of the notch in the substrate 11.

Thus, the coaxial cable 1 is located inside the notch portion 11A, making it possible to reduce the thickness (that is, size in the X direction) of the antenna 10 having the coaxial cable 1 connected thereto, and to make the antenna 10 smaller and thinner. Furthermore, since the holding member that holds the end of the coaxial cable 1 can be arranged so as to straddle the notch, the holding member can be easily soldered to the substrate 11.

Therefore, the substrate 11 has the notch portion 11A and the cable connecting portion 12 is positioned in the notch portion 11A, thus facilitating the connecting of the coaxial cable 1 to the antenna 10. Also, the antenna 10 having the coaxial cable 1 connected thereto can be made smaller and thinner.

The first conductor part 20 is a conductor part connected to the signal wire 2 of the coaxial cable 1. The first conductor part 20 includes the first line portion 21 provided in the first layer 13 (that is, the layer on the front surface side of the substrate 11) and a first extending portion 22 provided in the second layer 14 (that is, the layer on the back surface side of the substrate 11). The first conductor part 20 will be described in detail later.

The second conductor part 30 is a conductor part connected to the ground wire 3 of the coaxial cable 1. The second conductor part 30 includes a second line part 31 and a second extending part 32. To be more specific, the second line part 31 includes a second line portion 31A on the front surface side, a second line portion 31B on the back surface side, and a through-hole 31C connecting the second line portions 31A and 31B. The second extending part 32 includes a main body portion 32A, an additional portion 32B, and a through-hole 32C connecting the main body portion 32A and the additional portion 32B. The second conductor part 30 other than the above will be described in detail later.

The first and second conductor parts 20 and 30 are conductor patterns formed on the substrate 11 and function as elements that resonate in the radio wave frequency band supported by the antenna 10. Thus, by forming the elements of the antenna 10 with the conductor patterns on the substrate 11, the overall thickness of the antenna 10 is reduced. As a result, the antenna 10 can be made thinner, and the degree of freedom in arranging the antenna 10 is improved. By forming the elements of the antenna 10 with the conductor patterns on the substrate 11, the elements (first and second conductor parts 20 and 30) of the antenna 10 can be easily held.

The feeding portion 40 is a section including a feeding point of the antenna 10. In this embodiment, the feeding portion 40 is positioned between the first and second conductor parts 20 and 30 as illustrated in FIG. 1B.

As for broadband antennas for mobile communications, there may be a demand for further miniaturization of antennas. In this event, a leakage current to the coaxial cable side has sometimes become a problem.

Therefore, in the antenna 10 of this embodiment, the first and second conductor parts 20 and 30 are provided so as to operate as a sleeve dipole antenna. Thus, the antenna 10 can be made smaller and thinner, and the leakage current can also be suppressed. Prior to description of the characteristics of the first and second conductor parts 20 and of the antenna 10, antennas 50, 60, and 70 used as models when examining the antenna 10 will be described below.

<<Examination of Sleeve Dipole Antenna>>

Figures 3A, 3B, 3C, 3D:
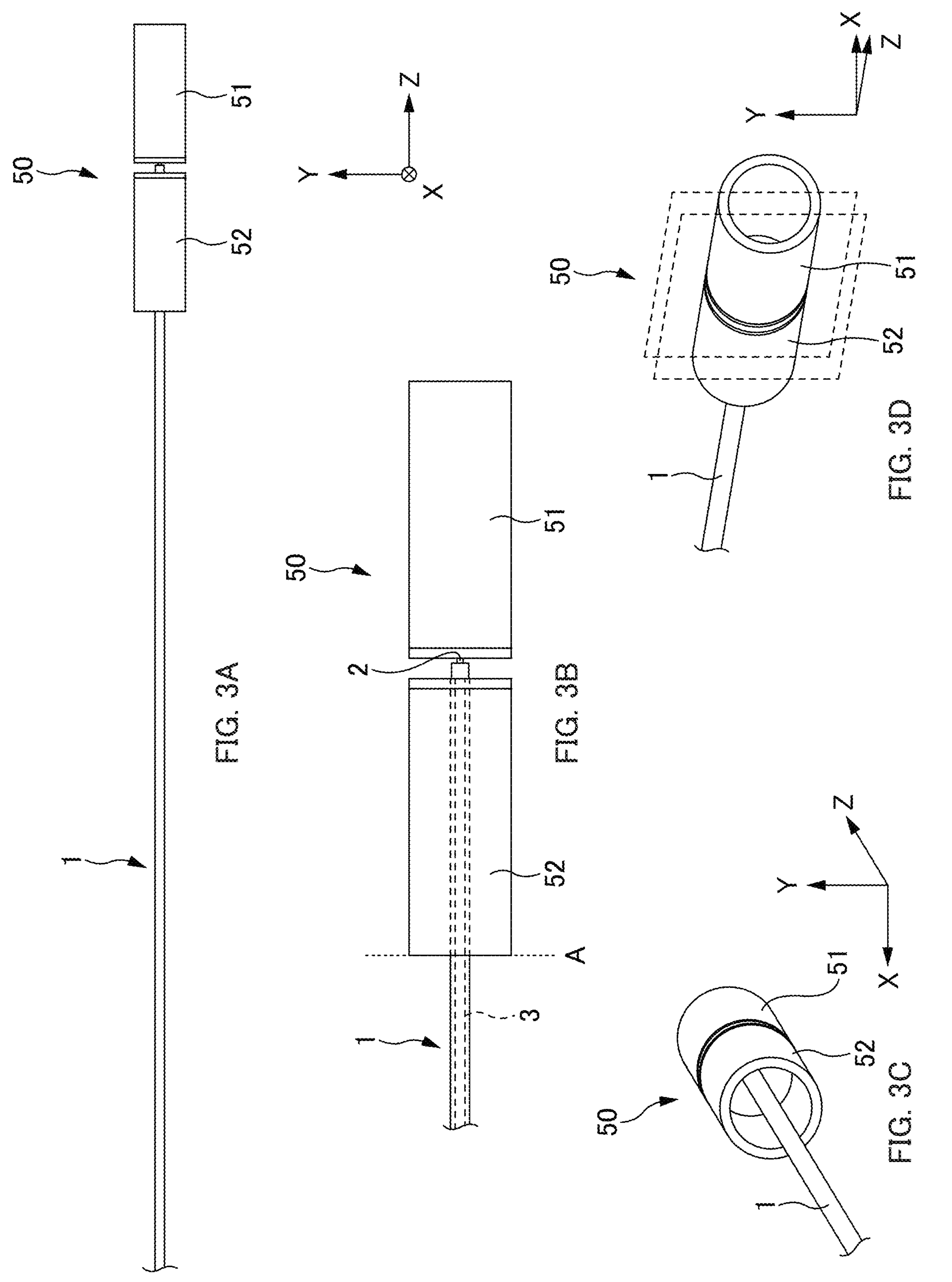
FIG. 3A is a plan view of the antenna 50.
FIG. 3B is an enlarged view of an element section of the antenna 50.
FIG. 3C is a perspective view of the element section of the antenna 50 as viewed in a +Z direction.
FIG. 3D is a perspective view of the element section of the antenna 50 as viewed in a −Z direction.

FIG. 3 is a diagram of the antenna 50. FIG. 3A is a plan view of the antenna 50. FIG. 3B is an enlarged view of the element section of the antenna 50. FIG. 3C is a perspective view of the element section of the antenna 50 when viewed in the +Z direction. FIG. 3D is a perspective view of the element section of the antenna 50 when viewed in the −Z direction.

The inventor first focused on the sleeve dipole antenna as an antenna that is advantageous for suppressing a leakage current. The antenna 50 illustrated in FIG. 3 is a common sleeve dipole antenna. As illustrated in FIG. 3, the antenna 50 has a coaxial cable 1 connected thereto. As illustrated in FIG. 3B, the coaxial cable 1 connected to the antenna 50 includes a signal wire 2 as an inner conductor and a ground wire 3 as an outer conductor, as in the case of the coaxial cable 1 connected to the antenna 10 described above.

The antenna 50 has a first element 51 and a second element 52.

The first element 51 is an element connected to the signal wire 2 of the coaxial cable 1. As illustrated in FIG. 3D, the first element 51 has an elongated sleeve shape with an opening in the +Z direction.

The second element 52 is an element connected to the ground wire 3 of the coaxial cable 1. As illustrated in FIG. 3C, the second element 52 has an elongated sleeve shape with an opening in the −Z direction.

To be more specific, the first and second elements 51 and 52 each have a cylindrical shape with a bottom surface as illustrated in FIG. 3. The first element 51 has a bottom surface on the −Z direction side and the second element 52 has a bottom surface on the +Z direction side.

As illustrated in FIGS. 3A and 3B, in the antenna 50, a sleeve of the first element 51 and a sleeve of the second element 52 are arranged end to end so that central axes of the sleeves are aligned. In other words, the first and second elements 51 and 52 are arranged end to end in the longitudinal direction.

As illustrated in FIG. 3B, the coaxial cable 1 is connected between the first and second elements 51 and 52. That is, the signal wire 2 of the coaxial cable 1 is connected to the end of the first element 51 on the −Z direction side (second element 52 side), while the ground wire 3 of the coaxial cable 1 is connected to the end of the second element 52 on the +Z direction side (first element 51 side). The coaxial cable 1 connected to the first and second elements 51 and 52 passes through the inside of the sleeve of the second element 52 and extends in the −Z direction.

The second element 52 of the antenna 50 has the highest impedance at the end on the −Z direction side indicated by the dashed line A in FIG. 3B. Therefore, by arranging the coaxial cable 1 so as to pass through the inside of the sleeve of the second element 52 in the antenna 50, a leakage current flowing toward the coaxial cable 1 side can be suppressed.

In the antenna 50, the longitudinal direction of the antenna 50 matches the direction of the coaxial cable 1 extending from the antenna 50. Therefore, it is particularly advantageous to employ the antenna 50 as the sleeve dipole antenna when it is desired to arrange the coaxial cable 1 so as to extend from the longitudinal end of the antenna 50.

The inventor then conceived the idea of reducing the thickness of the antenna 50 to mount the antenna 50 as the sleeve dipole antenna on the substrate 11. To be more specific, the inventor conceived the idea of removing both ends by cutting the first and second elements 51 and 52 of the antenna 50 along the plane indicated by the dashed line as illustrated in FIG. 3D.

Figure 4A:
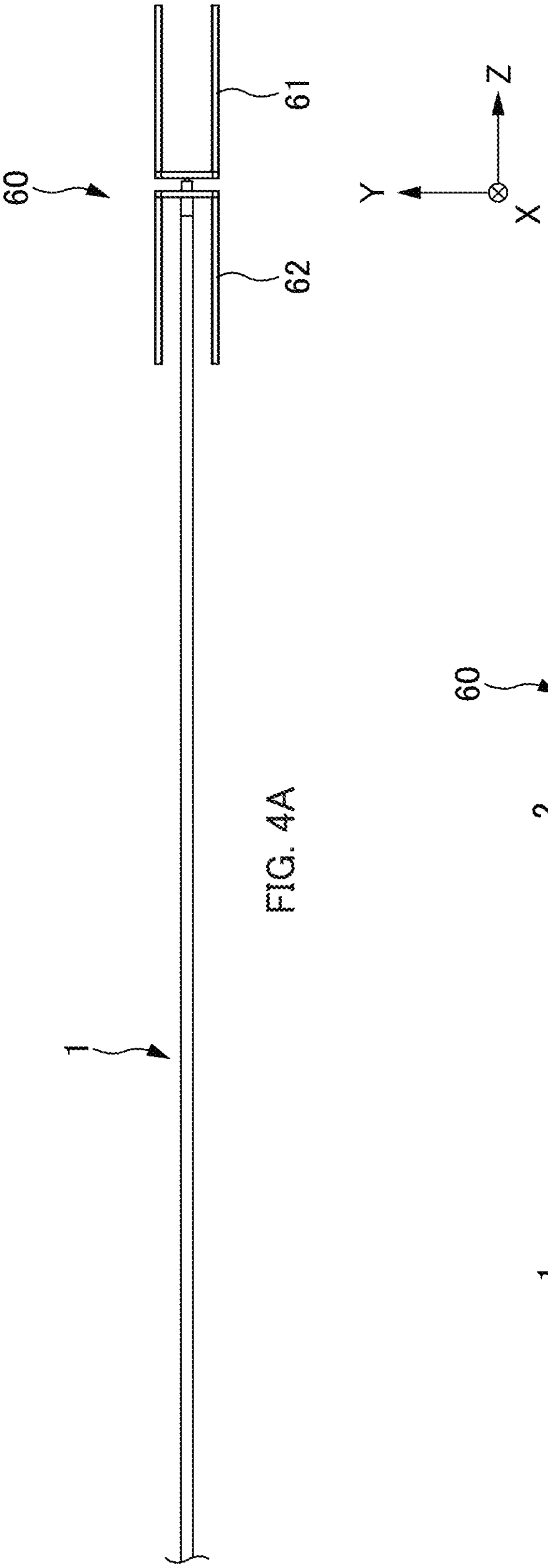
FIG. 4A is a plan view of the antenna 60 and FIG. 4B is an enlarged view of an element section of the antenna 60.
Figure 4B:
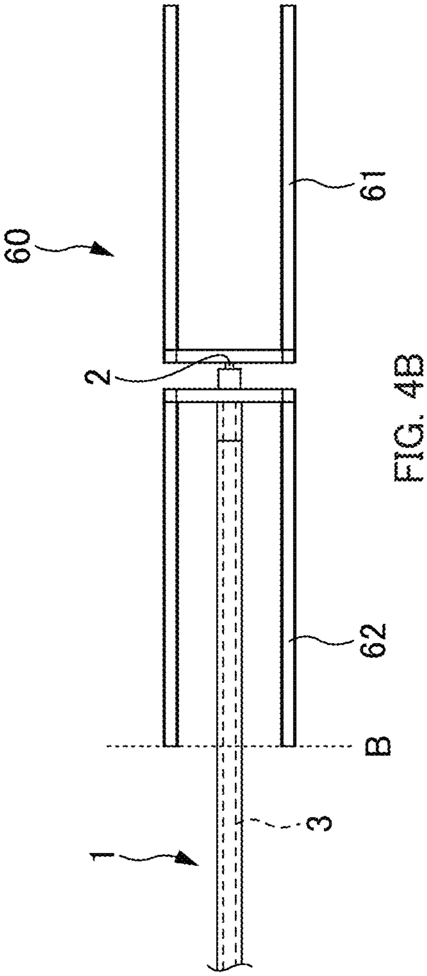

FIG. 4 is a diagram of the antenna 60. FIG. 4A is a plan view of the antenna 60. FIG. 4B is an enlarged view of an element section of the antenna 60.

The antenna 60 is of a model with both ends removed by cutting the first and second elements 51 and 52 of the antenna 50 along the plane indicated by the dashed line in FIG. 3D. As illustrated in FIG. 4, the antenna 60 has a coaxial cable 1 connected thereto. As illustrated in FIG. 4B, the coaxial cable 1 connected to the antenna 60 includes a signal wire 2 as an inner conductor and a ground wire 3 as an outer conductor, as in the case of the coaxial cable 1 connected to the antenna 50 described above.

The first element 61 is an element connected to the signal wire 2 of the coaxial cable 1. As illustrated in FIG. 4B, the first element 61 has a shape obtained by cutting an elongated sleeve with an opening in the +Z direction.

The second element 62 is an element connected to the ground wire 3 of the coaxial cable 1. As illustrated in FIG. 4B, the second element 62 has a shape obtained by cutting an elongated sleeve with an opening in the −Z direction.

To be more specific, the first and second elements 61 and 62 each have a shape like a tuning fork placed on the YZ plane, as illustrated in FIG. 4.

The features of the antenna 60 are the same as those of the antenna 50 except that the first and second elements 51 and 52 of the antenna 50 are cut along the plane indicated by the dashed line in FIG. 3D to remove both ends. That is, in the antenna 60, as illustrated in FIGS. 4A and 4B, the partial sleeve of the first element 61 and the partial sleeve of the second element 62 are arranged end to end so that central axes of the partial sleeves are aligned. In other words, the first and second elements 61 and 62 are arranged end to end in the longitudinal direction.

Then, the coaxial cable 1 is connected between the first and second elements 61 and 62 as illustrated in FIG. 4B. That is, the signal wire 2 of the coaxial cable 1 is connected to the end of the first element 61 on the −Z direction side (second element 62 side) and the ground wire 3 of the coaxial cable 1 is connected to the end of the second element 62 on the +Z direction side (first element 61 side). The coaxial cable 1 connected to the first and second elements 61 and 62 passes through the inside of the partial sleeve of the second element 62 and extends in the −Z direction.

As in the case of the second element 52 of the antenna 50, the second element 62 of the antenna 60 also has the highest impedance at the end on the −Z direction side indicated by the dashed line B in FIG. 4B. Therefore, as in the case of the antenna 50, by arranging the coaxial cable 1 so as to pass through the partial sleeve of the second element 62 in the antenna 60, a leakage current flowing toward the coaxial cable 1 side can be suppressed.

In the antenna 60, as in the case of the antenna 50, the longitudinal direction of the antenna 60 matches the direction of the coaxial cable 1 extending from the antenna 60. Therefore, it is particularly advantageous to employ the antenna 60 when it is desired to arrange the coaxial cable 1 so as to extend from the longitudinal end of the antenna 60.

Next, electric field distributions and directivity are simulated for the antennas 50 and 60 described above to check on a leakage current. These check results are described below.

Figure 5A:
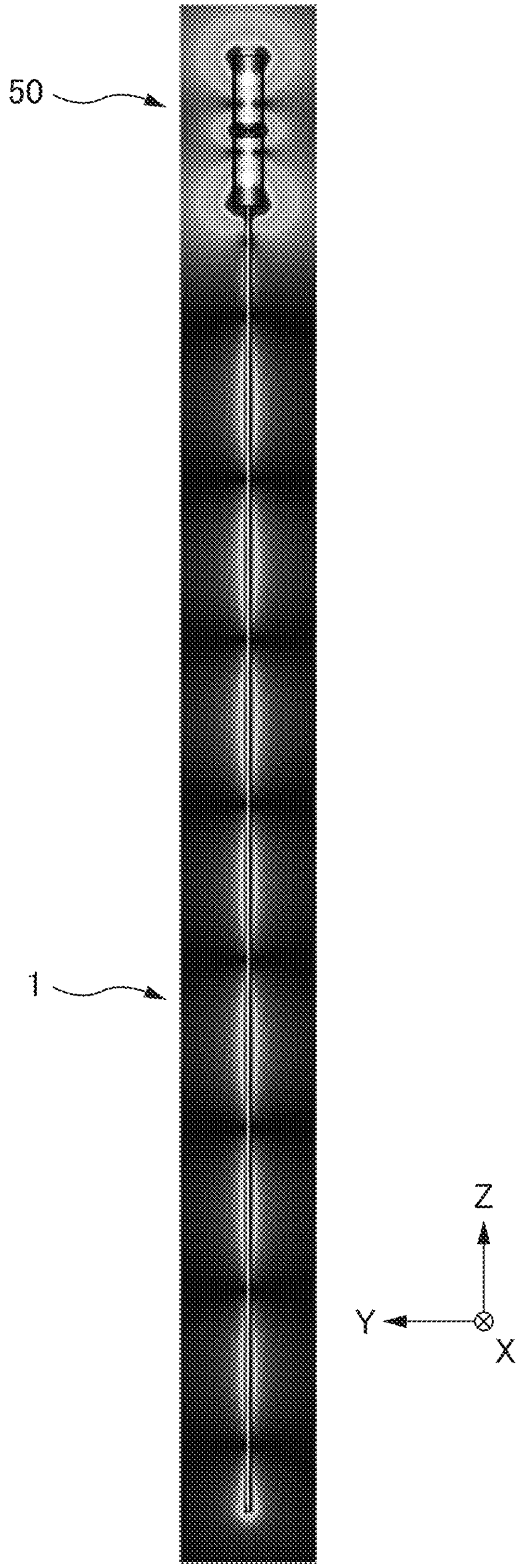
FIGS. 5A and 5B are diagrams illustrating electric field distributions of the antennas 50 and 60 each having a coaxial cable 1 connected thereto, FIG. 5A illustrating the electric field distribution of the antenna 50 and FIG. 5B illustrating the electric field distribution of the antenna 60.
Figure 5B:
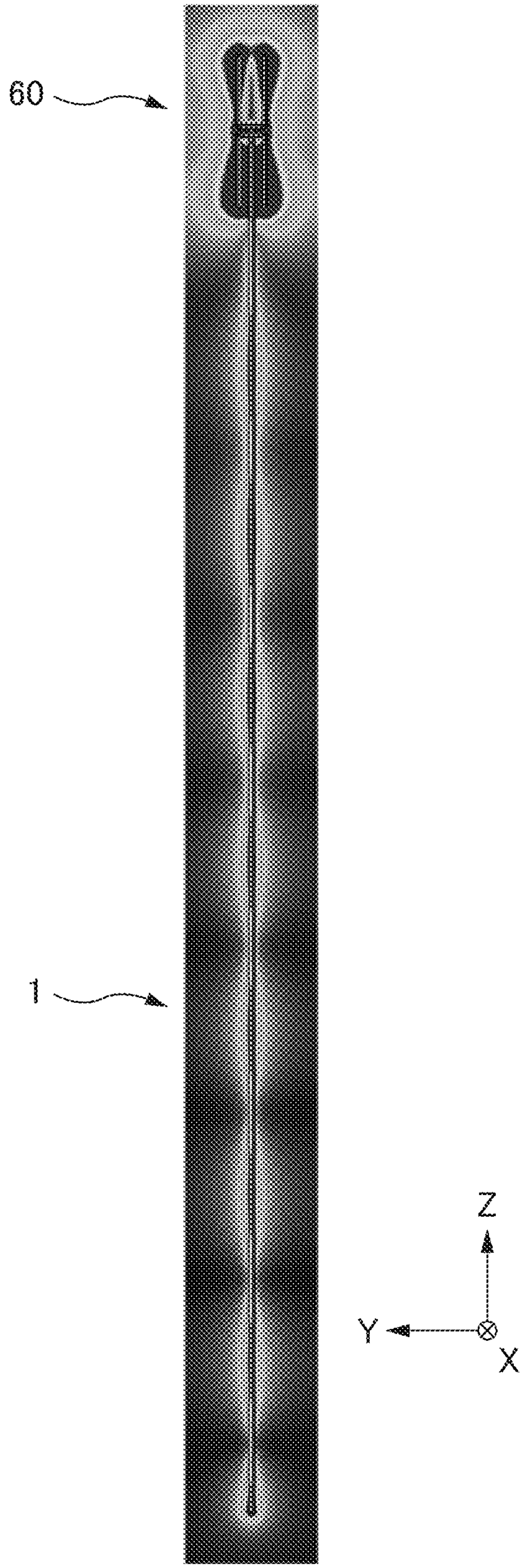
Figure 6A:
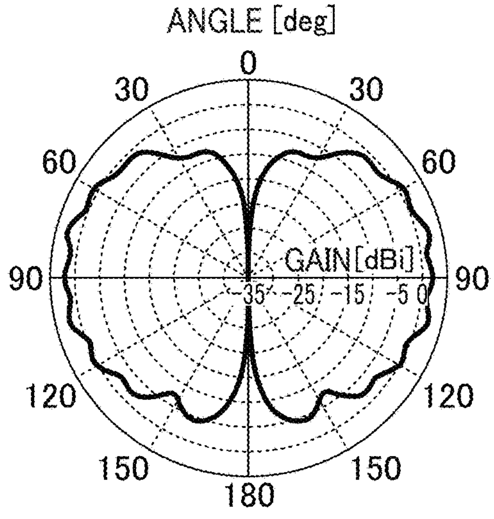
FIGS. 6A to 6F are graphs illustrating an example of directivity of the antennas 50 and 60, FIGS. 6A and 6B being graphs at 2400 MHz, FIGS. 6C and 6D being graphs at 2450 MHz, and FIGS. 6E and 6F being graphs at 2500 MHz.
Figure 6B:
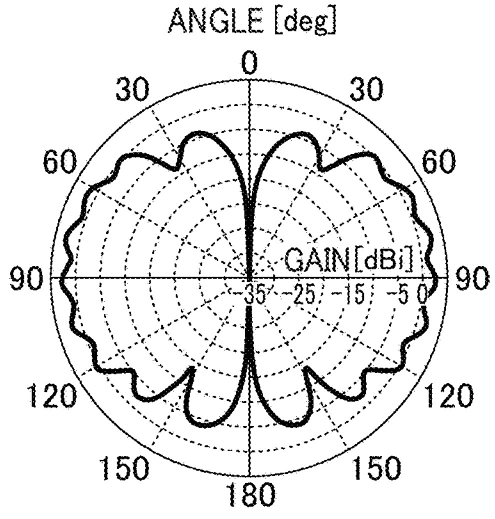
Figure 6C:
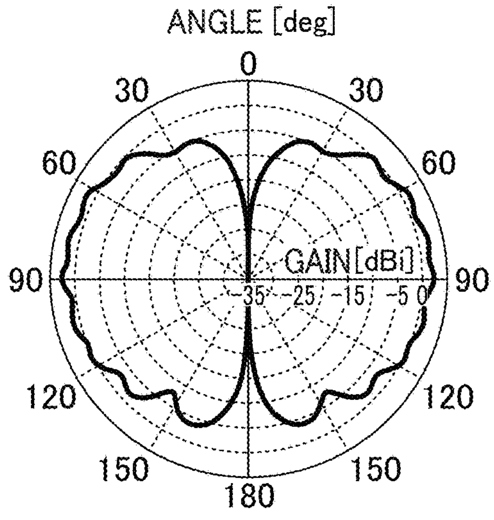
Figure 6D:
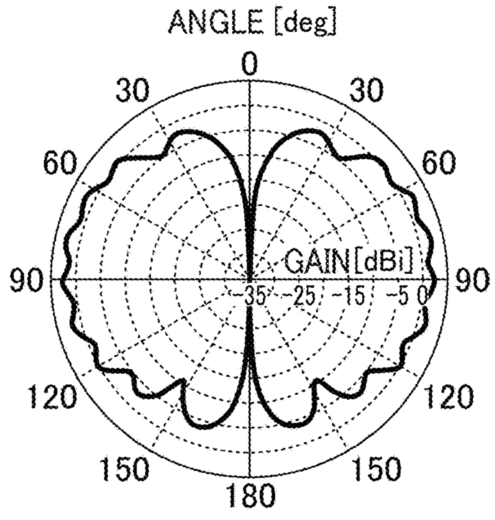
Figure 6E:
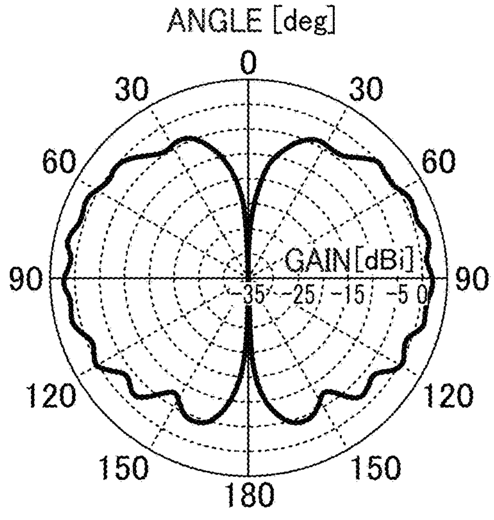
Figure 6F:
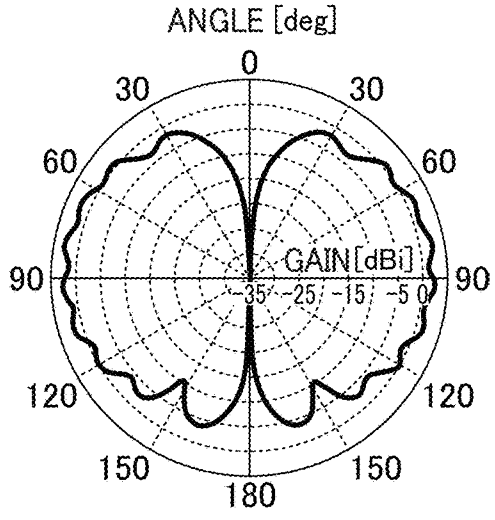

FIG. 5 is a diagram illustrating electric field distributions of the antennas 50 and 60 each having the coaxial cable 1 connected thereto. FIG. 5A is a diagram illustrating the electric field distribution of the antenna 50. FIG. 5B is a diagram illustrating the electric field distribution of the antenna 60. FIG. 6 is a graph illustrating an example of the directivity of the antennas 50 and 60. FIGS. 6A and 6B are graphs at 2400 MHz, FIGS. 6C and 6D are graphs at 2450 MHz, and FIGS. 6E and 6F are graphs at 2500 MHz. In FIG. 6, FIGS. 6A, 6C, and 6E illustrate the directivity of the antenna 50, while FIGS. 6B, 6D, and 6F illustrate the directivity of the antenna 60.

The electric field distribution illustrated in FIG. 5 visually represents a leakage current generated in the antenna. To be more specific, the leakage current generated in the antenna appears as a pattern with a plurality of constrictions along the coaxial cable 1. As the influence of the leakage current increases, ripples occur in the directivity of the antenna illustrated in FIG. 6.

As illustrated in FIGS. 5A, 6A, 6C, and 6E, the antenna 50 has less leakage current and good directivity. On the other hand, as illustrated in FIGS. 5B, 6B, 6D, and 6F, the antenna 60 has more leakage current than the antenna 50, and the influence of the leakage current causes ripples in the directivity in the 2.4 GHz band. That is, the antenna 60 has more leakage current than the antenna 50.

In the antenna 50, the entire periphery of the coaxial cable 1 is surrounded by the end of the second element 52 with the highest impedance. However, in the antenna 60, since the second element 62 has a shape obtained by removing a part of the second element 52, the coaxial cable 1 is not entirely surrounded by the end of the second element 62. That is, in the antenna 60, the portion where the second element 62 has the highest impedance is not closed around the coaxial cable 1. Therefore, it is considered that the antenna 60 is less effective in suppressing the leakage current than the antenna 50.

Therefore, the inventor focused on improving the effect of suppressing the leakage current by providing a Spertopf part in the antenna 60.

Figure 7:
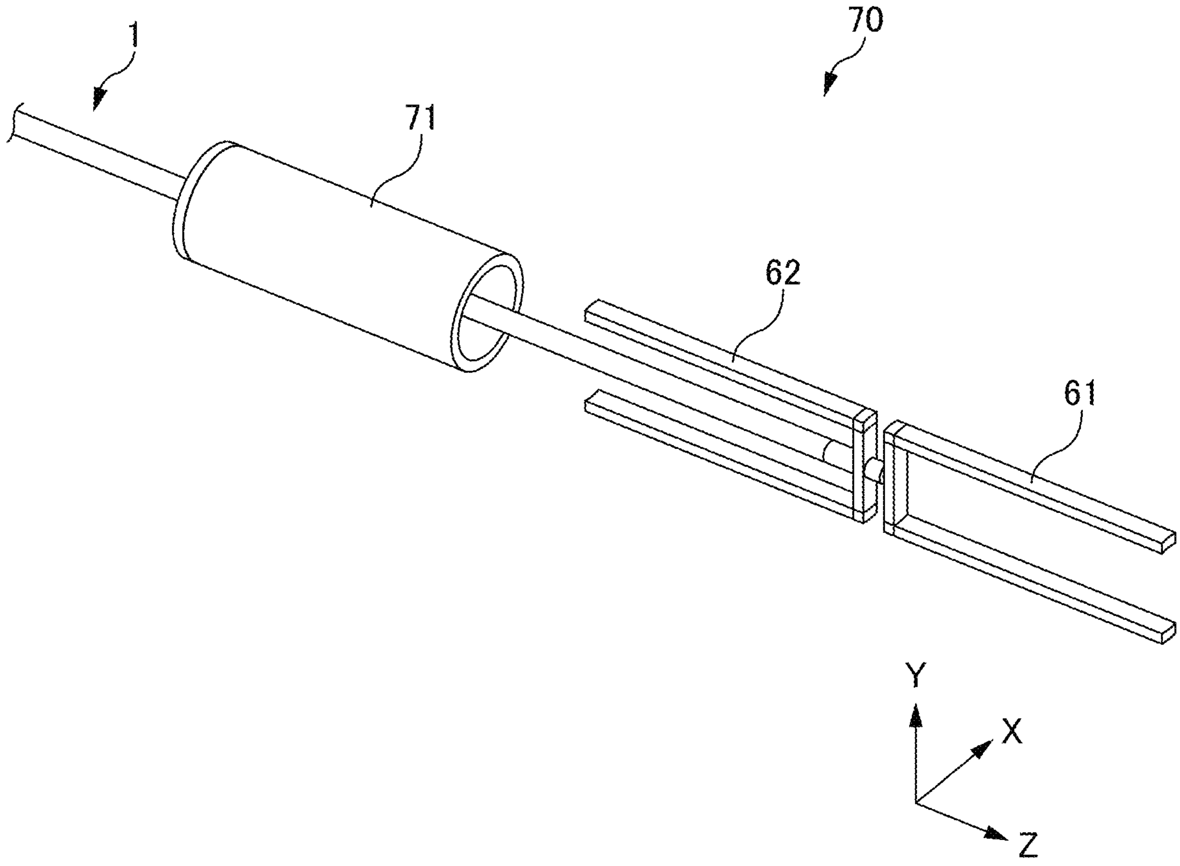
FIG. 7 is a perspective view of an antenna 70.

FIG. 7 is a perspective view of an antenna 70.

The antenna 70 further includes a Spertopf part 71 in addition to a first element 61 and a second element 62, which are the same as those of the antenna 60 described above. The Spertopf part 71 is a member that suppresses a leakage current of the antenna 70. As illustrated in FIG. 7, the Spertopf part 71 has an elongated sleeve shape with an opening in the +Z direction. To be more specific, the Spertopf part 71 has a cylindrical shape and is positioned on the −Z direction side with respect to the second element 62, as illustrated in FIG. 7.

Next, electric field distributions and directivity are simulated for the antenna 70 described above to check on a leakage current. These check results are described below.

Figure 8:
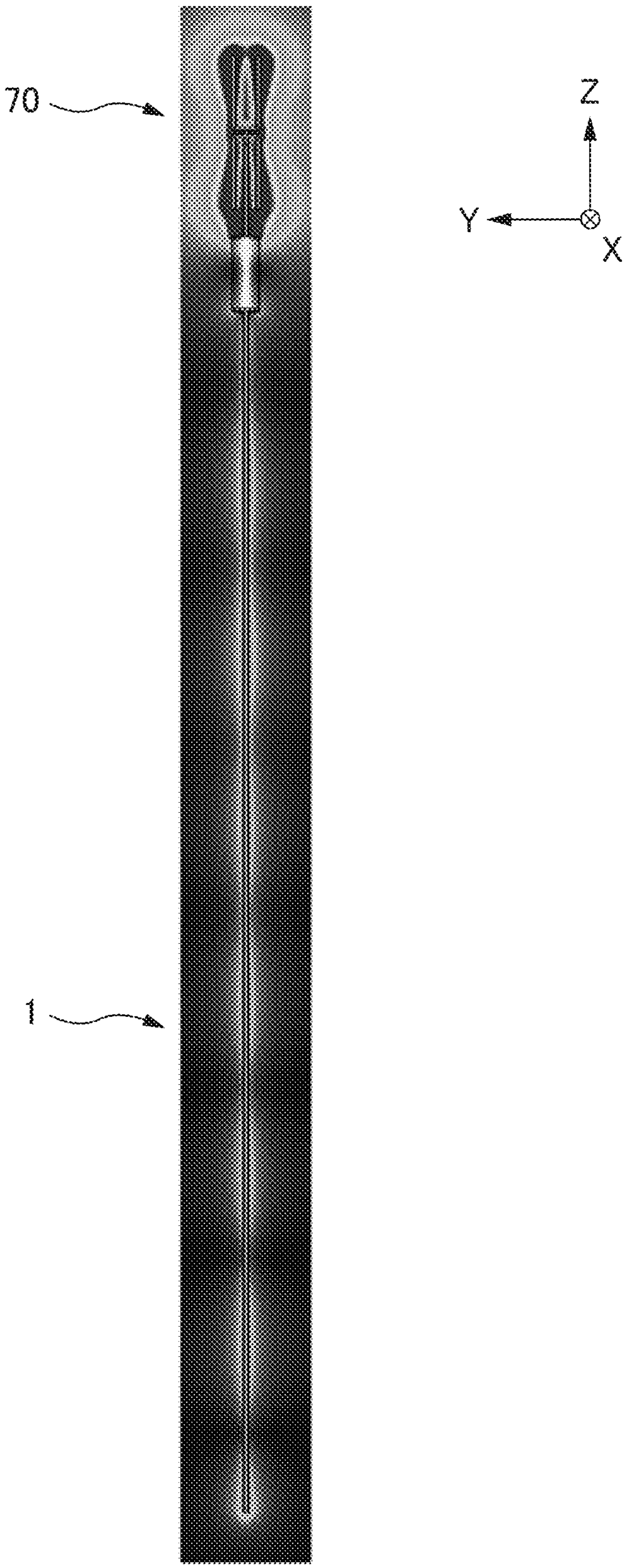
FIG. 8 is a diagram illustrating an electric field distribution of the antenna 70 having the coaxial cable 1 connected thereto.
Figure 9A:
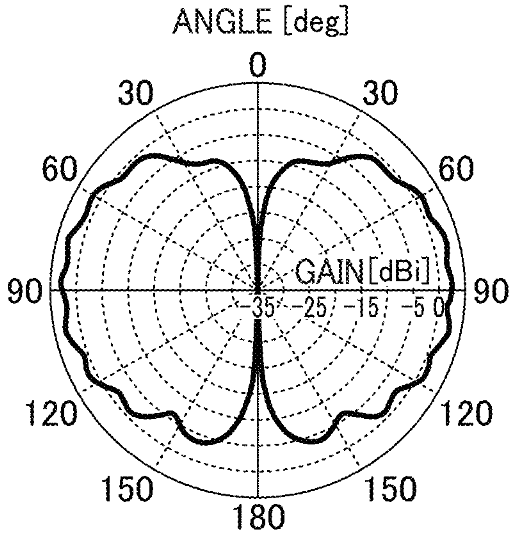
FIGS. 9A to 9C are graphs illustrating an example of directivity of the antenna 70, FIG. 9A being a graph at 2400 MHz, FIG. 9B being a graph at 2450 MHz, and FIG. 9C being a graph at 2500 MHz.
Figure 9B:
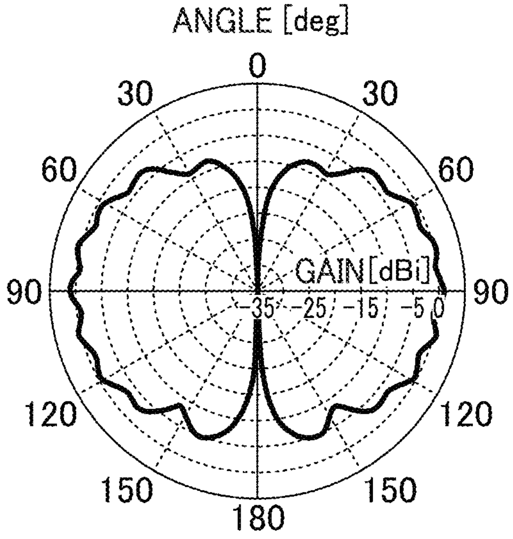
Figure 9C:
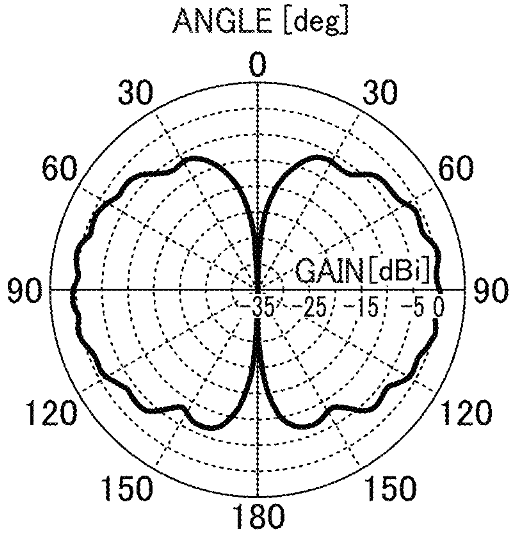

FIG. 8 is a diagram illustrating the electric field distribution of the antenna 70 having the coaxial cable 1 connected thereto. FIG. 9 is a graph illustrating an example of the directivity of the antenna 70. FIG. 9A is a graph at 2400 MHz, FIG. 9B is a graph at 2450 MHz, and FIG. 9C is a graph at 2500 MHz.

As illustrated in FIGS. 8 and 9, the antenna 70 has less leakage current and improved directivity compared to the antenna 60 illustrated in FIGS. 5B, 6B, 6D, and 6F described above. Therefore, the antenna 10 of this embodiment aims to achieve the characteristics of the antenna 70 in these check results.

The inventor implemented the antenna 10 of this embodiment by forming conductor patterns (first and second conductor parts 20 and 30) on the substrate 11 based on the antenna 70 described above. That is, in the antenna 10 of this embodiment, the first and second conductor parts 20 and are provided so as to operate as a sleeve dipole antenna. Moreover, in the antenna 10 of this embodiment, at least part of the second conductor part 30 also has a structure that suppresses the leakage current. Thus, the antenna can be made smaller and thinner, and the leakage current can be suppressed.

[Details of Antenna 10 of First Example]

With reference to FIGS. 1 and 2 again, a detailed configuration of the antenna 10 that reduces the size of the antenna and suppresses the leakage current will be described below.

The first conductor part 20 has the first line portion 21, the first extending portion 22, and a through-hole 24.

The first line portion 21 is a portion where a configuration corresponding to the signal wire 2 of the coaxial cable 1 is mounted on the substrate 11. As illustrated in FIGS. 1A and 2, the first line portion 21 is formed in the first layer 13 of the substrate 11 (that is, the layer on the front surface side of the substrate 11). The end of the first line portion 21 on the −Z direction side is connected to the signal wire 2, and the end of the first line portion 21 on the +Z direction side is connected to the first extending portion 22 through the through-hole 24.

The first extending portion 22, as well as a second extending portion 32 described below, is a portion where a configuration as an element that resonates in the radio wave frequency band (for example, 2.4 GHz band and 5 GHz band) supported by the antenna 10 is mounted on the substrate 11. Therefore, the first extending portion 22 is formed to have a length and a width adapted to an operating wavelength in the radio wave frequency band supported by the antenna 10 (for example, a wavelength in the 2.4 GHz band).

In the antenna 10 of this embodiment, an electrical length of the first extending portion 22 from the feeding portion 40 is set so as to resonate in the radio wave frequency band supported by the antenna 10. For example, the electrical length of the first extending portion 22 from the feeding portion 40 is set to correspond to ¼ of the wavelength in the radio wave frequency band supported by the antenna 10.

Here, "¼ of the wavelength in the radio wave frequency band supported by the antenna 10" is not limited to an exact value but may be a value that allows resonance in a desired frequency band. This is because the wavelength in the radio wave frequency band supported by the antenna 10 is not necessarily represented by a divisible integer, and the actual electrical length of the first extending portion 22 from the feeding portion 40 varies due to various factors. The electrical length of the first extending portion 22 from the feeding portion 40 does not have to be formed to correspond to ¼ of the wavelength in the radio wave frequency band supported by the antenna 10 as long as it is set to allow resonance in the radio wave frequency band supported by the antenna 10.

In the antenna 10 of this embodiment, the first extending portion 22 is formed so as to extend from the feeding portion to both sides in the Y direction as illustrated in FIG. 1B. The electrical length of the first extending portion 22 extending to both sides in the Y direction from the feeding portion 40 is set to correspond to ¼ of the wavelength in the radio wave frequency band supported by the antenna 10. The first extending portion 22 is formed in the second layer 14 of the substrate 11 (that is, the layer on the back surface side of the substrate 11) as illustrated in FIGS. 1B and 2. The end of the first extending portion 22 on the −Z direction side is connected to the first line portion 21 through the through-hole 24.

The first extending portion 22 has a bent portion 23. The bent portion 23 is a portion that is bent and further extends from the end of the first extending portion 22 on the +Z direction side. Thus, even when the substrate 11 is small, the electrical length of the first extending portion 22 from the feeding portion 40 can be ensured to be sufficient for resonance in the radio wave frequency band supported by the antenna 10. Note that the bent portion 23 is not limited to a bent shape as long as it has a shape obtained by further extending the length of the first extending portion 22. That is, the bent portion 23 may have a curved shape, a folded shape, a meandering shape, or the like.

In the antenna 10 of this embodiment, the bent portion 23 is formed to be bent toward the inner side of the first extending portion 22, but may be formed to be bent outward. The bent portion 23 may also be formed so as to extend from other than the end of the first extending portion 22 on the +Z direction side. Moreover, the bent portion 23 is formed in the same shape on each of the first extending portions 22 extending along both sides in the Y direction, but may be formed on only one of the first extending portions 22. Alternatively, the bent portions 23 having different shapes may be formed on the first extending portions 22 extending along both sides in the Y direction. For example, the bent portion 23 that is bent inward may be formed at the end of the first extending portion 22 extending in the +Y direction, and the bent portion 23 that is bent outward may be formed at the end of the first extending portion 22 extending in the −Y direction.

The through-hole 24 is a portion that connects the first line portion 21 formed in the first layer 13 of the substrate 11 to the first extending portion 22 formed in the second layer 14 of the substrate 11. The through-hole 24 electrically connects the first line portion 21 to the first extending portion 22.

The second conductor part 30 has the second line portion 31 and the second extending portion 32.

The second line portion 31 is a portion where a configuration corresponding to the ground wire 3 of the coaxial cable 1 is mounted on the substrate 11. As illustrated in FIGS. 1 and 2, the second line portion 31 includes the front surface side second line portion 31A formed in the first layer 13 of the substrate 11 (that is, the layer on the front surface side of the substrate 11) and the back surface side second line portion 31B formed in the second layer 14 of the substrate 11 (that is, the layer on the back surface side of the substrate 11).

The front surface side second line portion 31A is formed so as to extend in the Z direction along the first line portion 21 of the first conductor part 20. A pair of front surface side second line portions 31A are formed on both sides of the first line portion 21 in the Y direction. The pair of front surface side second line portions 31A have their ends on the −Z direction side connected to the ground wire 3.

As in the case of the front surface side second line portion 31A, the back surface side second line portion 31B is formed so as to extend in the Z direction. The back surface side second line portion 31B has its end on the +Z direction side connected to the main body portion 32A of the second extending portion 32. The back surface side second line portion 31B is provided between the cable connecting portion 12 and the feeding portion 40.

In this embodiment, the second line portion 31 is arranged parallel to the first line portion 21. However, as long as the first and second line portions 21 and 31 are not coupled to each other, the first and second line portions 21 and 31 may be non-parallel, and at least one of them may be curved or meandering.

The second line portion 31 further includes a through-hole 31C. The through-hole 31C is a portion that connects the front surface side second line portion 31A formed in the first layer 13 of the substrate 11 to the back surface side second line portion 31B formed in the second layer 14 of the substrate 11. The through-hole 31C electrically connects the front surface side second line portion 31A to the back surface side second line portion 31B.

In the antenna 10 of this embodiment, a plurality of through-holes 31C are arranged side by side in the Z direction along the front surface side second line portion 31A as illustrated in FIGS. 1 and 2. Each of the through-holes 31C connects the front surface side second line portion 31A to the back surface side second line portion 31B. By providing a number of through-holes 31C, those through-holes function as if a wall made of a conductor is provided.

Together with the first extending portion 22, the second extending portion 32 having the main body portion 32A, the additional portion 32B, and the through-hole 32C is a portion where a configuration as an element that resonates in the radio wave frequency band (for example, 2.4 GHz band and 5 GHz band) supported by the antenna 10 is mounted on the substrate 11. Therefore, the second extending portion 32 is formed to have a length and a width adapted to an operating wavelength in the radio wave frequency band supported by the antenna 10 (for example, a wavelength in the 2.4 GHz band).

In the antenna 10 of this embodiment, an electrical length of the second extending portion 32 from the feeding portion 40 is set so as to resonate in the radio wave frequency band supported by the antenna 10. For example, the electrical length of the first extending portion 32 from the feeding portion 40 is set to correspond to ¼ of the wavelength in the radio wave frequency band supported by the antenna 10. The electrical length of the second extending portion 32 from the feeding portion 40 does not have to be formed to correspond to ¼ of the wavelength in the radio wave frequency band supported by the antenna 10 as long as it is set to allow resonance in the radio wave frequency band supported by the antenna 10.

In the antenna 10 of this embodiment, the second extending portion 32 is formed so as to extend from the feeding portion 40 to both sides in the Y direction as illustrated in FIGS. 1B and 2. That is, the second extending portion 32 extends from the feeding portion 40 and is positioned so as to sandwich the back surface side second line portion 31B. The electrical length of the second extending portion 32 extending to both sides in the Y direction from the feeding portion 40 is set to correspond to ¼ of the wavelength in the radio wave frequency band supported by the antenna 10.

As described above, the second extending portion 32 has the main body portion 32A, the additional portion 32B, and the through-hole 32C.

The main body portion 32A is a portion of the second extending portion 32 formed in the second layer 14 of the substrate 11 (that is, the layer on the back surface side of the substrate 11).

The additional portion 32B is a portion additionally provided to the main body portion 32A to ensure an electrical length required for resonance in the radio wave frequency band corresponding to the antenna 10. The additional portion 32B is formed in the first layer 13 of the substrate 11 (that is, the layer on the front surface side of the substrate 11).

Here, the additional portion 32B may be formed in the second layer 14 of the substrate 11, instead of the first layer 13 of the substrate 11. That is, the additional portion 32B may be formed in the same layer as the layer in which the main body portion 32A is formed, like the bent portion 23 of the first extending portion 22. In this case, the additional portion 32B is formed so as to bend inward from the end of the main body portion 32A, for example. However, the additional portion 32B may be coupled with the second line portion 31 (back surface side second line portion 31B) due to its proximity, which may adversely affect the characteristics.

Therefore, by providing the additional portion 32B in the layer different from the layer in which the main body portion 32A is formed, the electrical length required for resonance in the radio wave frequency band supported by the antenna 10 can be ensured and adverse effects on the characteristics due to proximity to the second line portion 31 can be suppressed.

The through-hole 32C is a portion that connects the additional portion 32B formed in the first layer 13 of the substrate 11 to the main portion 32A formed in the second layer 14 of the substrate 11. The through-hole 32C electrically connects the additional portion 32B to the main body portion 32A.

In the antenna 10 of this embodiment, as illustrated in FIG. 1B, the first extending portion 22 of the first conductor part 20 and the second extending portion 32 of the second conductor part 30 are positioned in the same second layer 14 of the substrate 11. In the region where the first and second conductor parts 20 and 30 located in the same second layer 14 face each other, the first and second conductor parts 20 and each have a self-similar shape portion 41. This makes it possible to realize the antenna 10 that supports a wide band, particularly in the 5 GHz band.

Here, "self-similar shape" is a shape that is similar even when the scale (size ratio) changes. However, the first and second conductor parts 20 and 30 do not have to have the self-similar shape portion 41.

Hereinafter, at least one of the first and second line portions 21 and 31 may be simply referred to as the "line portion". Likewise, at least one of the first and second extending portions 22 and 32 may be simply referred to as the "extending portion".

In the antenna 10 of this embodiment, as illustrated in FIGS. 1A and 1B, the layer of the substrate 11 (that is, the first layer 13) where the cable connecting portion 12 is positioned is different from the layer of the substrate 11 (that is, the second layer 14) where part of the second conductor part 30 is positioned. That is, the layer in which the line portion of the antenna 10 is formed is different from the layer in which the extending portion of the antenna 10 is formed. Thus, the substrate 11 can be reduced in size and VSWR characteristics can be improved.

Figure 10A:
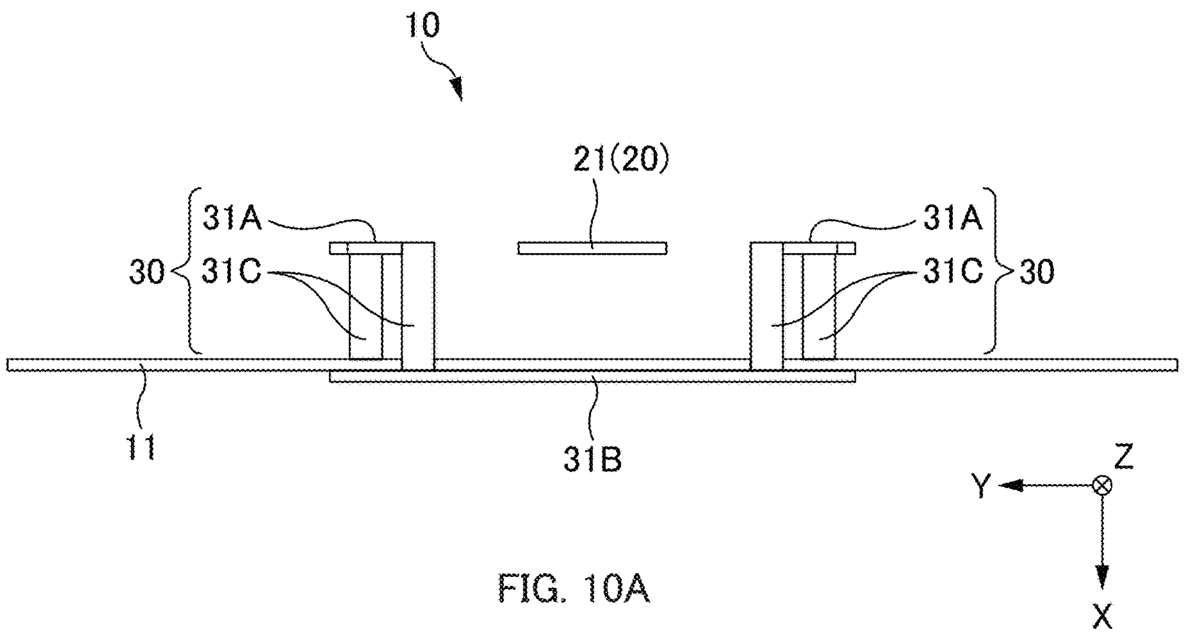
FIG. 10A is a cross-sectional view of the line portion of the antenna 10 and FIG. 10B is a schematic cross-sectional view of the line portion of the antenna 10.
Figure 10B:
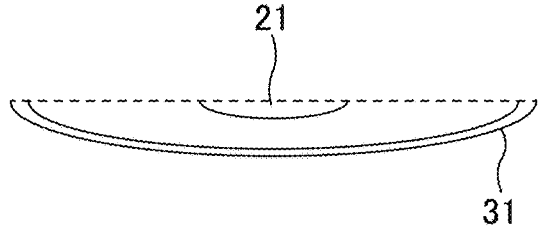

FIG. 10 is a diagram of the line portion of the antenna 10. FIG. 10A is a cross-sectional view of the line portion of the antenna 10. FIG. 10B is a schematic cross-sectional view of the line portion of the antenna 10.

As illustrated in FIG. 10A, the line portion of the antenna 10 of this embodiment has a structure similar to a microstrip line, including the back surface side second line portion 31B connected to the ground wire 3 and the first line portion 21 connected to the signal wire 2. The line portion of the antenna 10 of this embodiment further includes the through-hole 31C as a conductor that functions as a ground on the side surface. Thus, in the antenna 10 of this embodiment, as illustrated in FIG. 10B, the first line portion 21 connected to the signal wire 2 and the second line portion 31 connected to the ground wire 3 have a coaxial structure, and half of the structure is configured.

Figure 11:
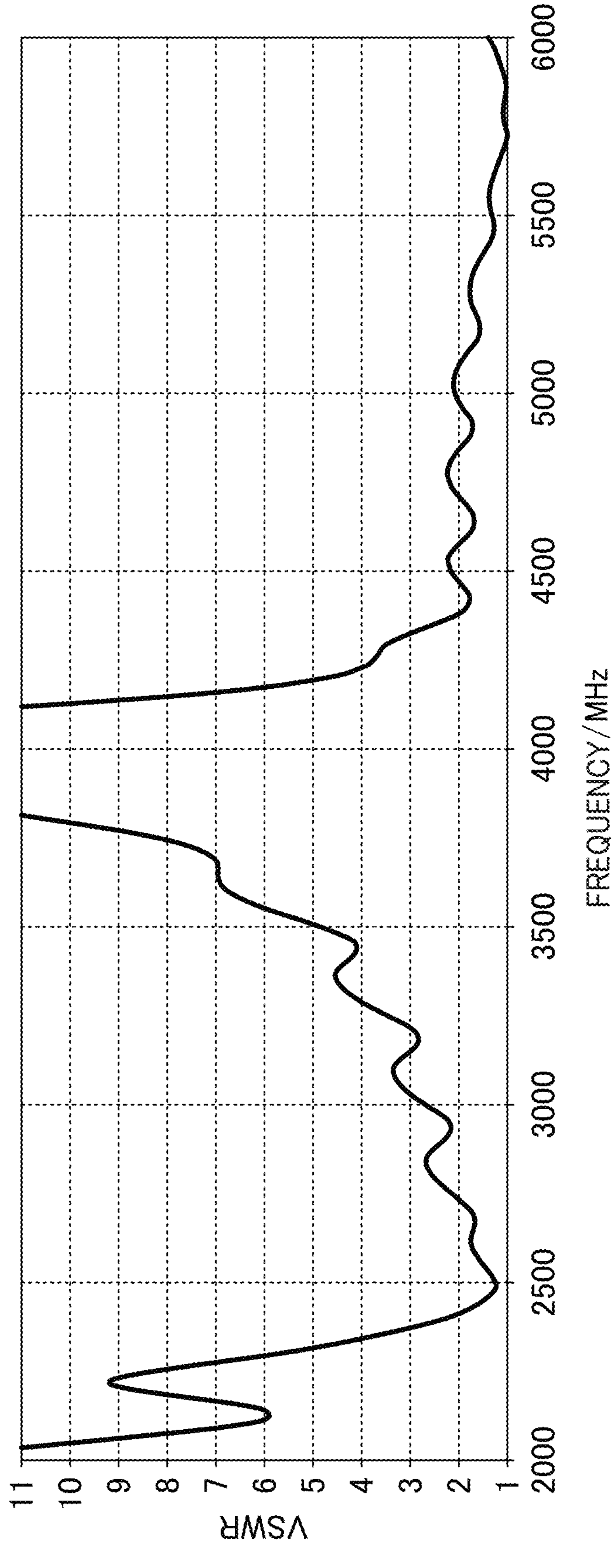
FIG. 11 is a graph illustrating an example of frequency characteristics of the antenna 10.

FIG. 11 is a graph illustrating an example of frequency characteristics of the antenna 10.

In FIG. 11, the horizontal axis represents frequency and the vertical axis represents voltage standing wave ratio (VSWR). In FIG. 11, the solid line indicates a calculation result for the antenna 10.

As illustrated in FIG. 11, the antenna 10 has good VSWR characteristics particularly in the range of 2400 MHz to 2500 MHz in the 2.4 GHz band. As illustrated in FIG. 11, the antenna 10 has good VSWR characteristics also in the range of 5500 to 6000 MHz in the 5 GHz band.

Figure 12:
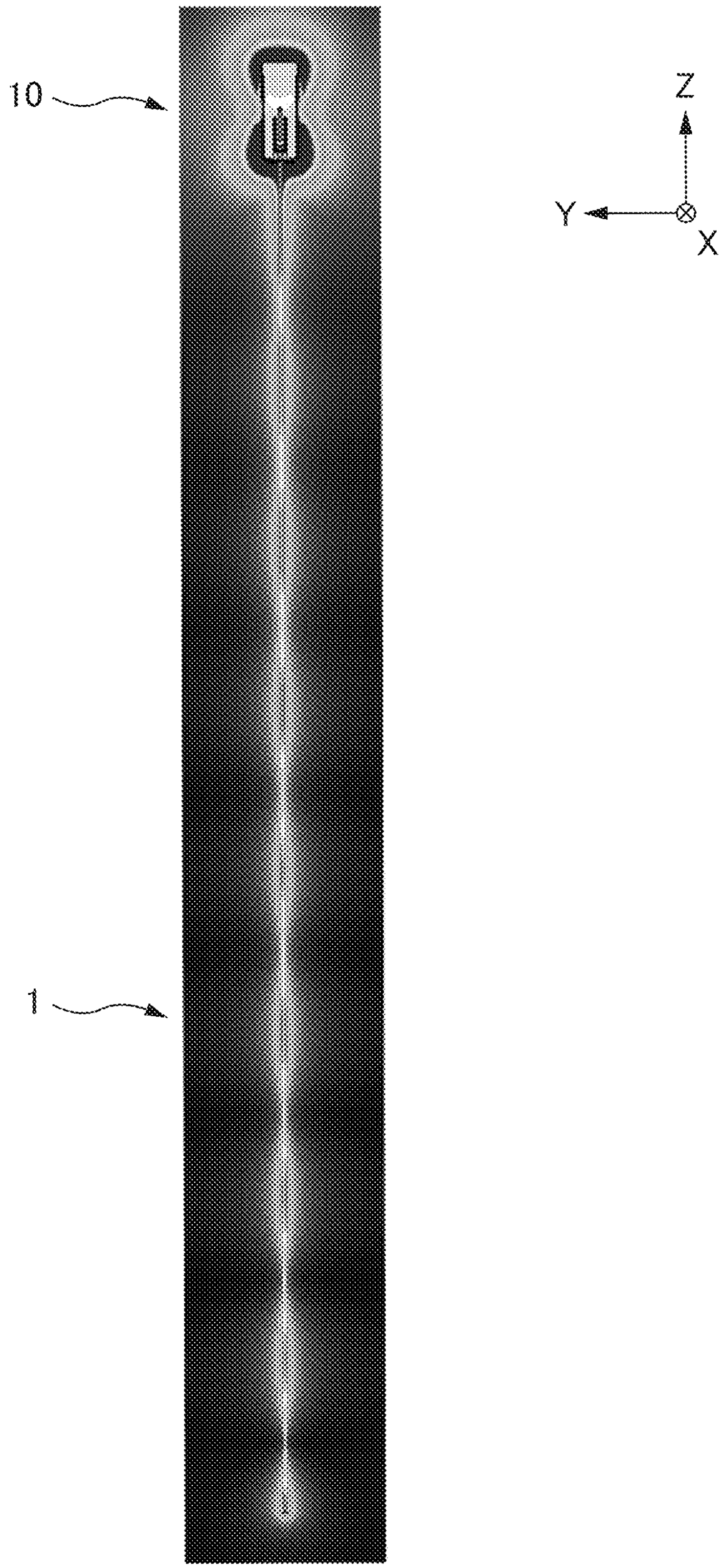
FIG. 12 is a diagram illustrating an electric field distribution of the antenna 10 having the coaxial cable 1 connected thereto.
Figure 13A:
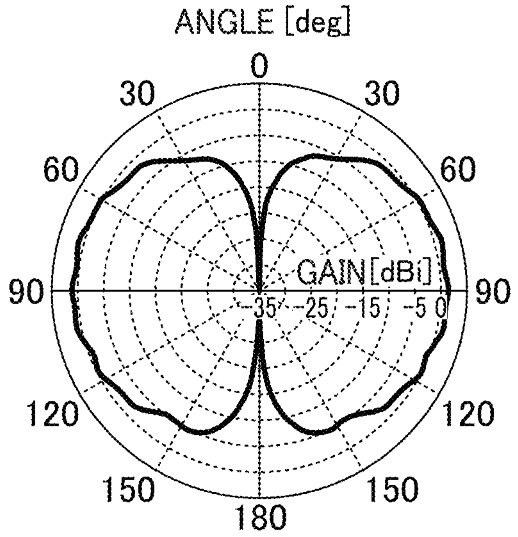
FIGS. 13A to 13C are graphs illustrating an example of directivity of the antenna 10, FIG. 13A being a graph at 2400 MHz, FIG. 13B being a graph at 2450 MHz, and FIG. 13C being a graph at 2500 MHz.
Figure 13B:
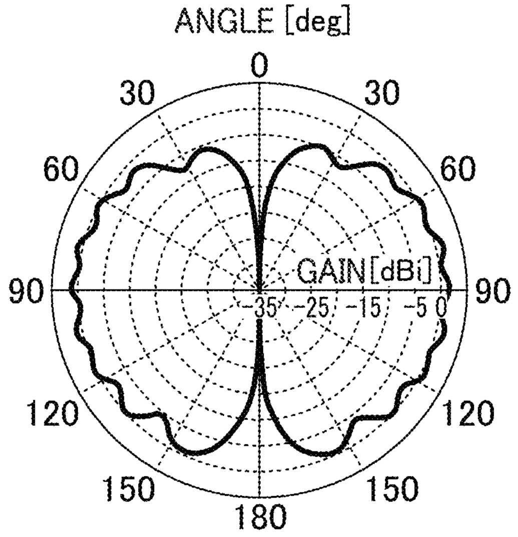

FIG. 12 is a diagram illustrating the electric field distribution of the antenna 10 having the coaxial cable 1 connected thereto. FIG. 13 is a graph illustrating an example of the directivity of the antenna 10. FIG. 13A is a graph at 2400 MHz, FIG. 13B is a graph at 2450 MHz, and FIG. 13C is a graph at 2500 MHz.

Figure 13C:
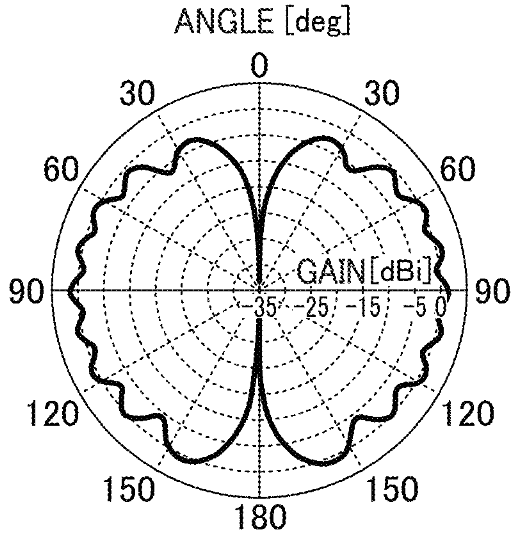

As illustrated in FIGS. 12 and 13, a leakage current of the antenna 10 is suppressed to some extent by providing the first and second conductor parts 20 and 30 so as to operate as a sleeve dipole antenna. However, as illustrated in FIG. 13C, the directivity deteriorates around 2500 MHz, which is the upper limit of the 2.4 GHz band. Therefore, the antenna 10 has room for improvement to achieve the target characteristics of the antenna 70.

As for the structure for resonating in the radio wave frequency band supported by the antenna 10, the electrical length of the element (extending portion) has a dominant influence. Therefore, the influence of the wavelength shortening effect by the dielectric layer 16 of the substrate 11 is relatively small. On the other hand, since the structure for suppressing the leakage current is determined by the relationship between the line portion and the extending portion of the antenna 10, the influence of the dielectric layer 16 of the substrate 11 between the line portion and the extending portion is increased. As a result, wavelength shortening is more likely to occur.

<<Antenna 80 of Second Example>>

An antenna 80 described below can further suppress the leakage current from the antenna 10 by adjusting the electrical length of the structure for suppressing the leakage current independently of the electrical length of the extending portion. The "structure for suppressing the leakage current" may be referred to as a "Spertopf structure".

Figure 14A:
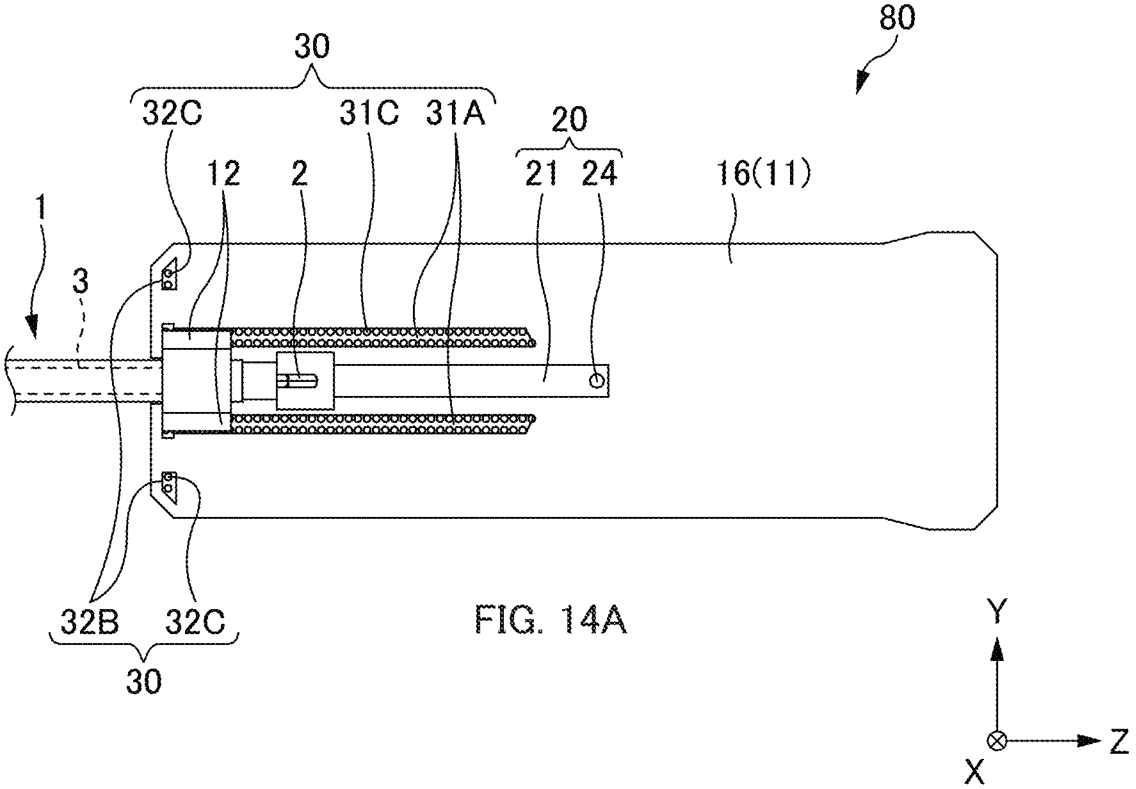
FIGS. 14A and 14B are plan views of an antenna 80 according to a second example of this embodiment, FIG. 14A illustrating a front surface side of the antenna 80 and FIG. 14B illustrating a back surface side of the antenna 80.
Figure 14B:
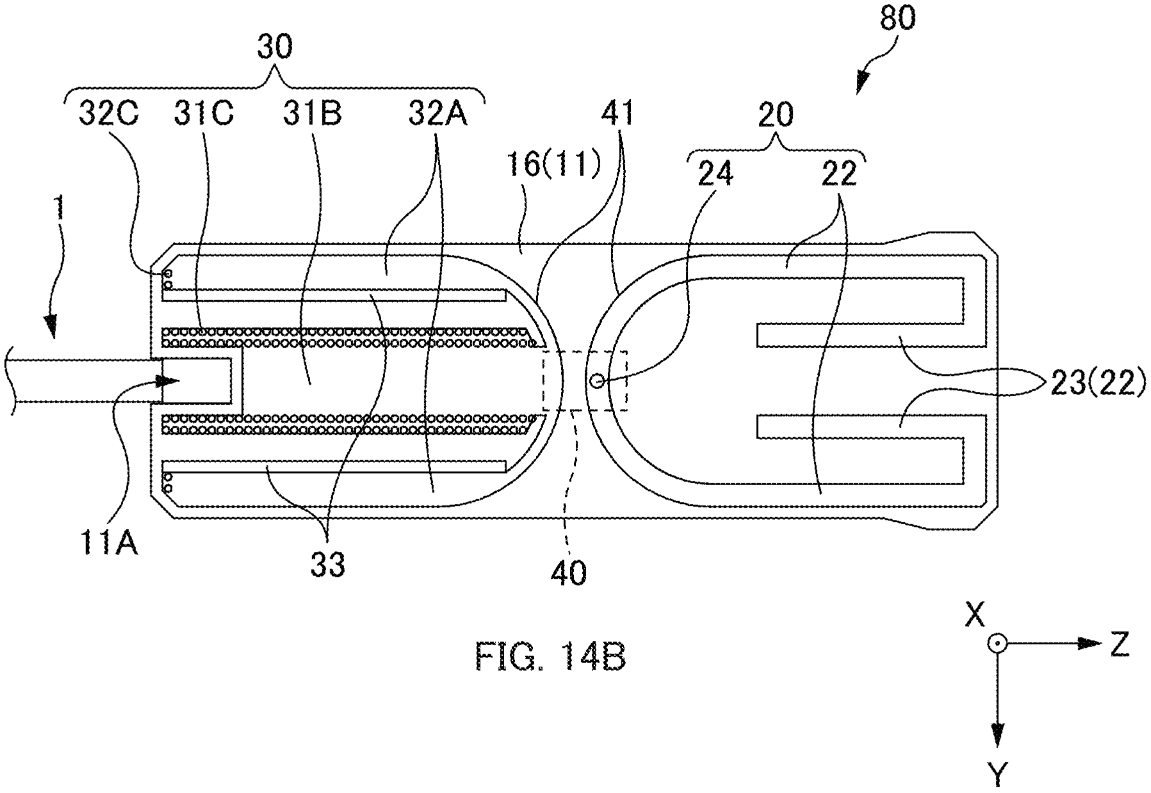

FIG. 14 is a plan view of the antenna 80 according to a second example of this embodiment. FIG. 14A is a view of a front surface side of the antenna 80. FIG. 14B is a view of a back surface side of the antenna 80.

The antenna 80 of the second example has the same configuration as that of the antenna 10 of the first example except that the second extending portion 32 of the second conductor part 30 further includes an adjusting portion 33.

The adjusting portion 33 is an additional conductor portion provided on the back surface side second line portion 31B side of the main body portion 32A of the second extending portion 32. Thus, a distance between the main body portion 22A and the back surface side second line portion 31B is reduced, and a path length L and a capacitance C inside the Spertopf structure change. This allows the Spertopf structure to be adjusted independently. That is, the antenna 80 of the second example is an antenna obtained by adjusting the Spertopf structure independently in the antenna 10 of the first example.

Figure 15:
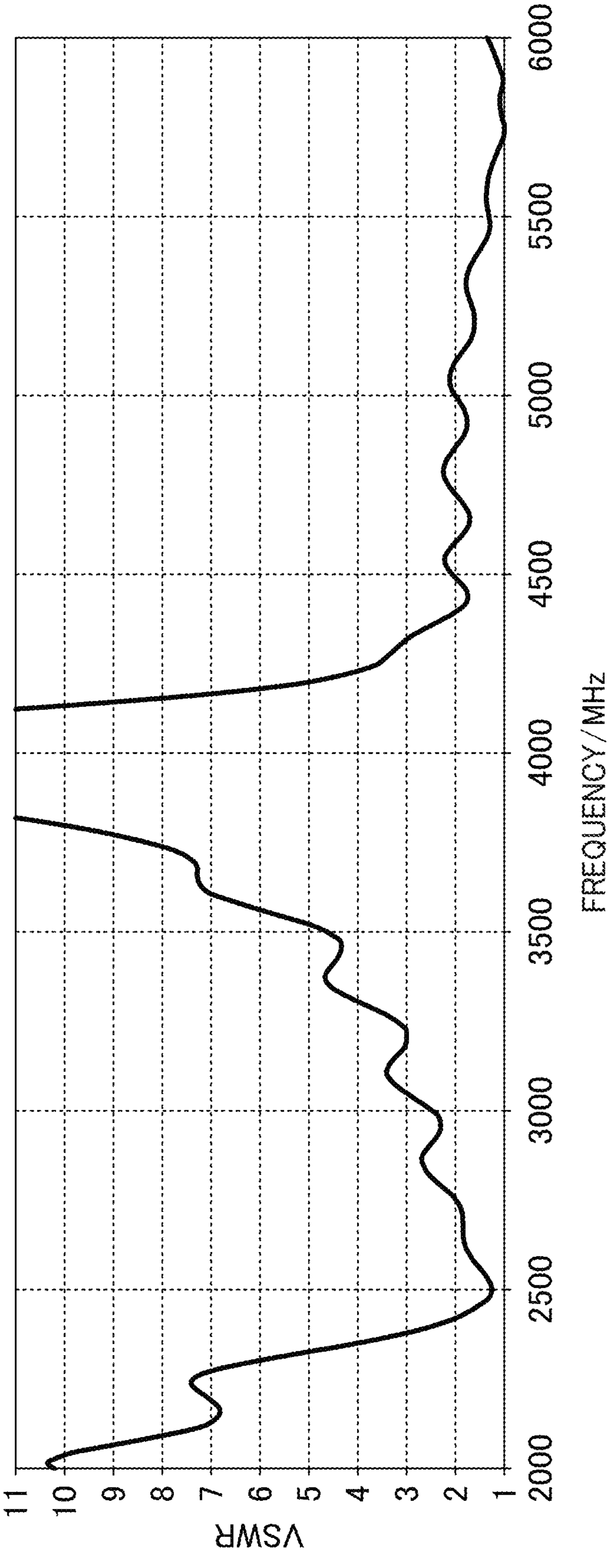
FIG. 15 is a graph illustrating an example of frequency characteristics of the antenna 80.

FIG. 15 is a graph illustrating an example of frequency characteristics of the antenna 80.

In FIG. 15, the horizontal axis represents frequency and the vertical axis represents voltage standing wave ratio (VSWR). In FIG. 15, the solid line indicates a calculation result for the antenna 80.

As illustrated in FIG. 15, the antenna 80, as in the case of the antenna 10, has good VSWR characteristics especially in the range of 2400 MHz to 2500 MHz in the 2.4 GHz band. As in the case of the antenna 10, the antenna 80 has good VSWR characteristics also in the range of 5500 to 6000 MHz in the 5 GHz band.

Figure 16:
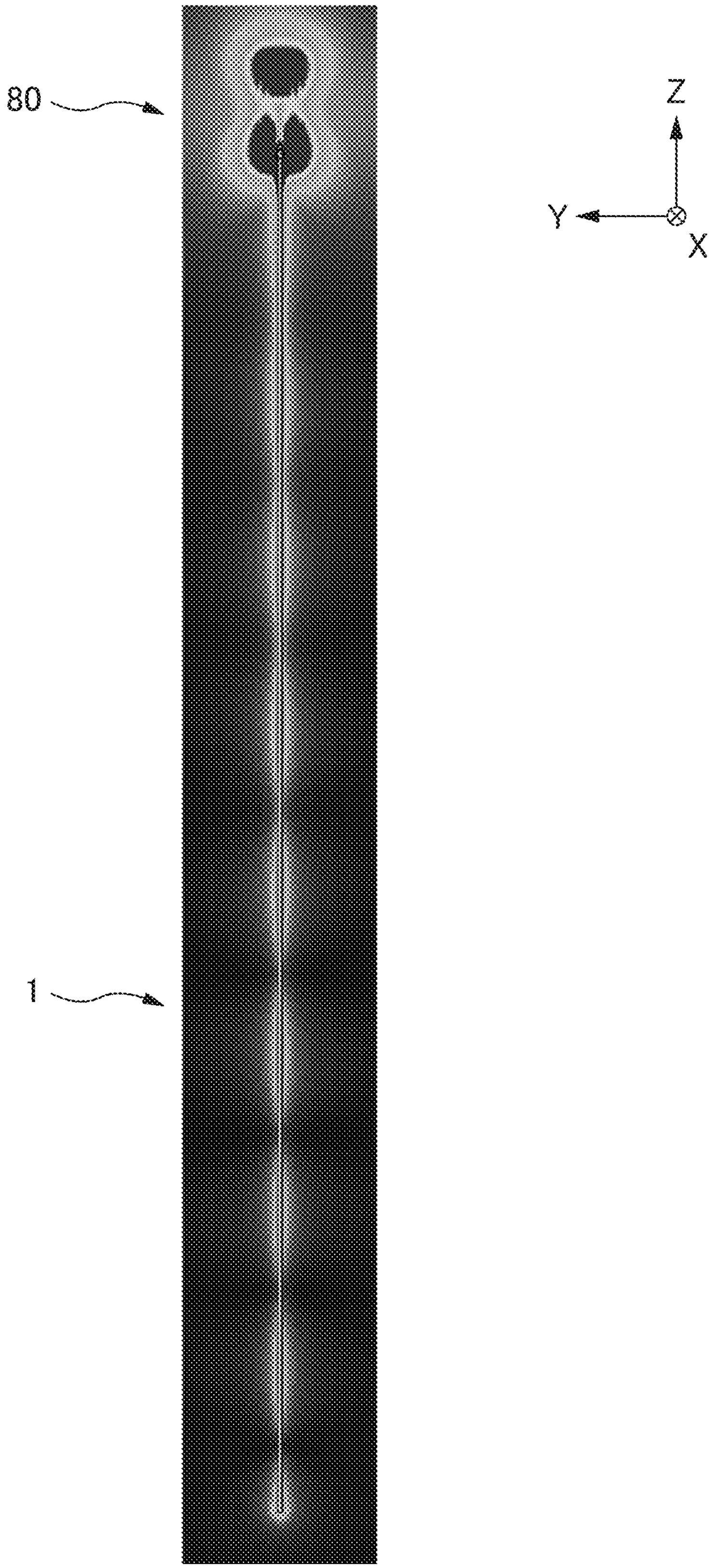
FIG. 16 is a diagram illustrating an electric field distribution of the antenna 80 having the coaxial cable 1 connected thereto.

FIG. 16 is a diagram illustrating electric field distributions of the antenna 80 having the coaxial cable 1 connected thereto.

Figure 17A:
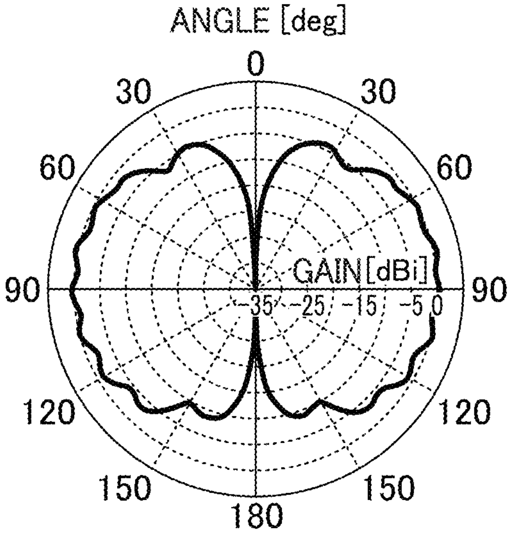
FIGS. 17A to 17C are graphs illustrating an example of directivity of the antenna 80, FIG. 17A being a graph at 2400 MHz, FIG. 17B being a graph at 2450 MHz, and FIG. 17C being a graph at 2500 MHz.
Figure 17B:
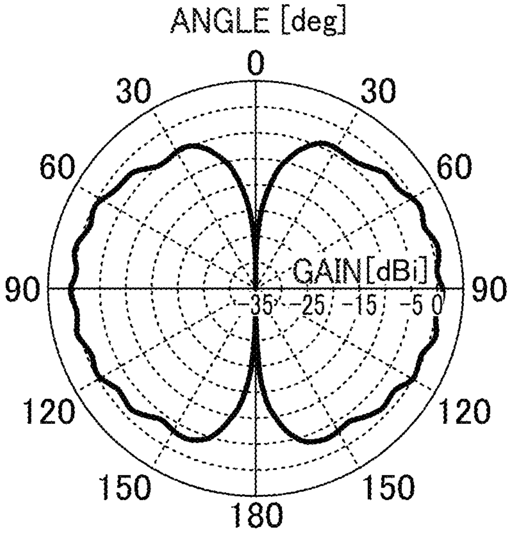
Figure 17C:
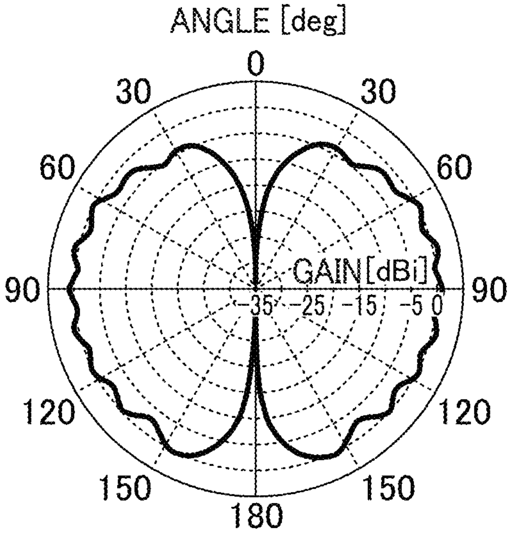

FIG. 17 is a graph illustrating an example of directivity of the antenna 80. FIG. 17A is a graph at 2400 MHz, FIG. 17B is a graph at 2450 MHz, and FIG. 17C is a graph at 2500 MHz.

As illustrated in FIGS. 16 and 17, a leakage current from the antenna 80 is further suppressed compared to the antenna 10 by independently adjusting the Spertopf structure. Therefore, it can be seen that the antenna 80 comes fairly close to the characteristics of the antenna 70 illustrated in FIGS. 8 and 9.

Figure 18A:
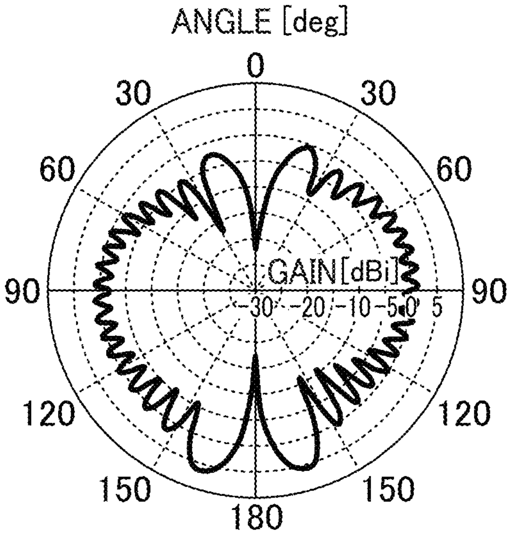
FIGS. 18A to 18C are graphs illustrating an example of directivity of the antenna 80, FIG. 18A being a graph at 5100 MHz, FIG. 18B being a graph at 5400 MHz, and FIG. 18C being a graph at 5700 MHz.
Figure 18B:
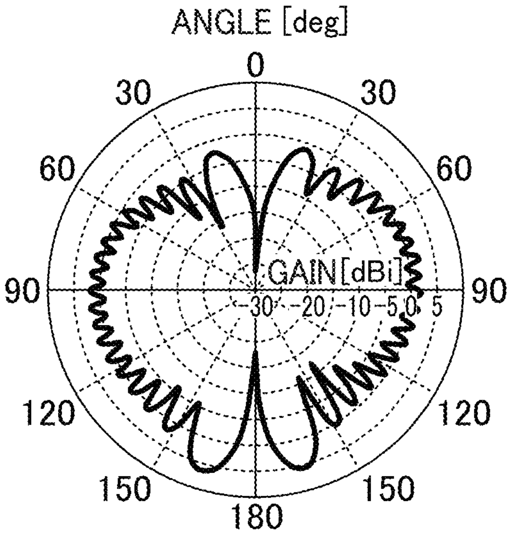
Figure 18C:
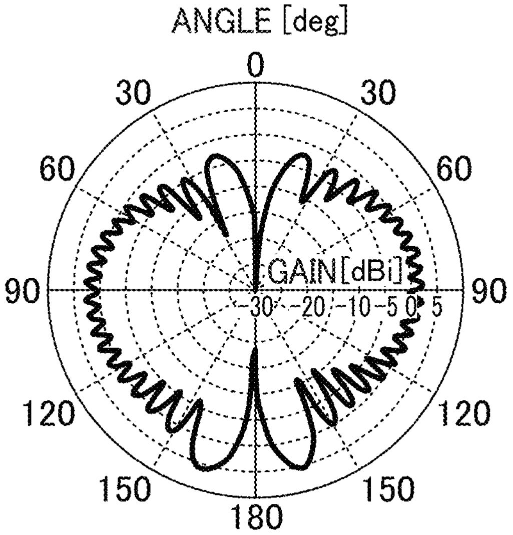

FIG. 18 is a graph illustrating an example of the directivity of the antenna 80. FIG. 18A is a graph at 5100 MHz, FIG. 18B is a graph at 5400 MHz, and FIG. 18C is a graph at 5700 MHz.

Although the leakage current from the antenna 80 is suppressed to some extent also in the 5 GHz band as illustrated in FIG. 18, ripples occur in the directivity as compared to the 2.4 GHz band illustrated in FIGS. 16 and 17. However, the GHz band is expected to operate as a traveling wave and thus has a higher tolerance for leakage current compared to the 2.4 GHz band. Thus, the need for independent adjustment of the Spertopf structure is not so high.

<<Antenna 90 of First Modified Example>>

In the antennas 10 and 80 described above, the first and second conductor parts 20 and 30 have different shapes. However, the first and second conductor parts 20 and 30 may have the same shape as in the case of an antenna 90 of a first modified example described below.

More specifically, in the antennas 10 and 80 described above, the first extending portion 22 of the first conductor part 20 has the bent portion 23 that is bent from the end and further extended. However, the antenna 90 of the first modified example may have the same configuration as that of the second extending portion 32 of the second conductor part 30.

Figure 19A:
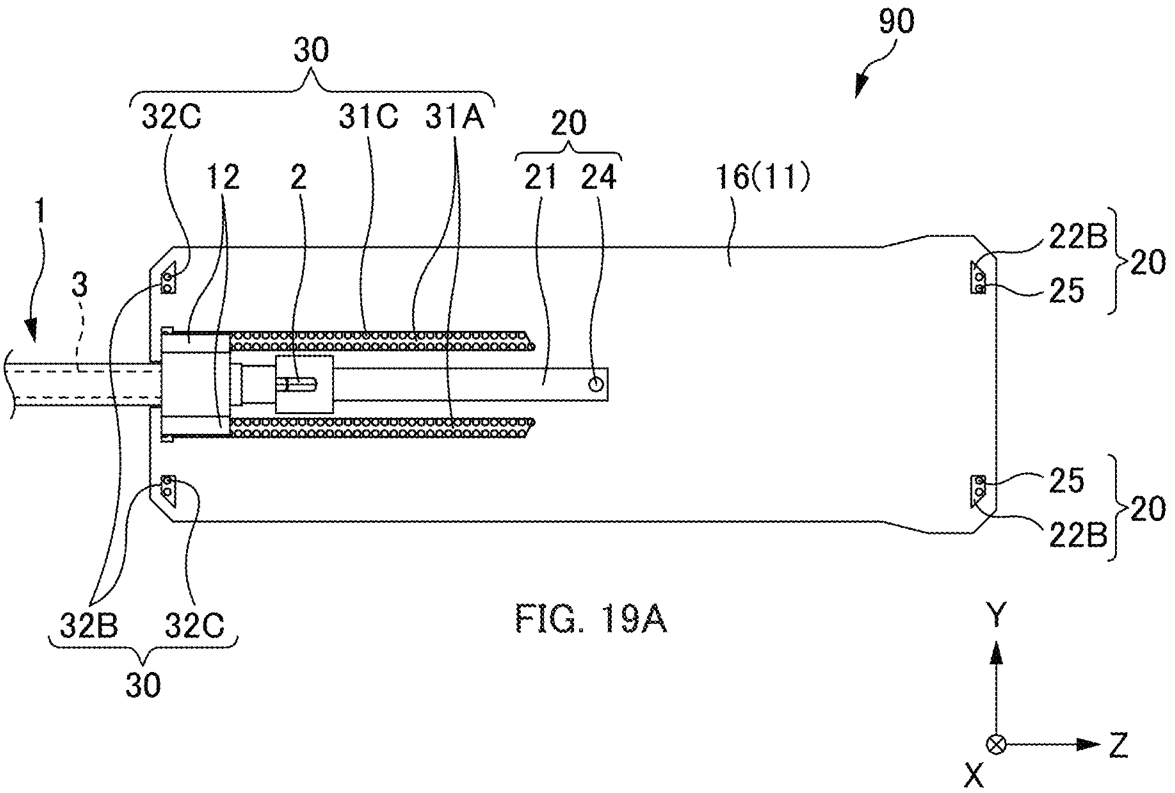
FIGS. 19A and 19B are plan views of an antenna 90 according to a first modified example of this embodiment, FIG. 19A illustrating a front surface side of the antenna 90 and FIG. 19B illustrating a back surface side of the antenna 90.
Figure 19B:
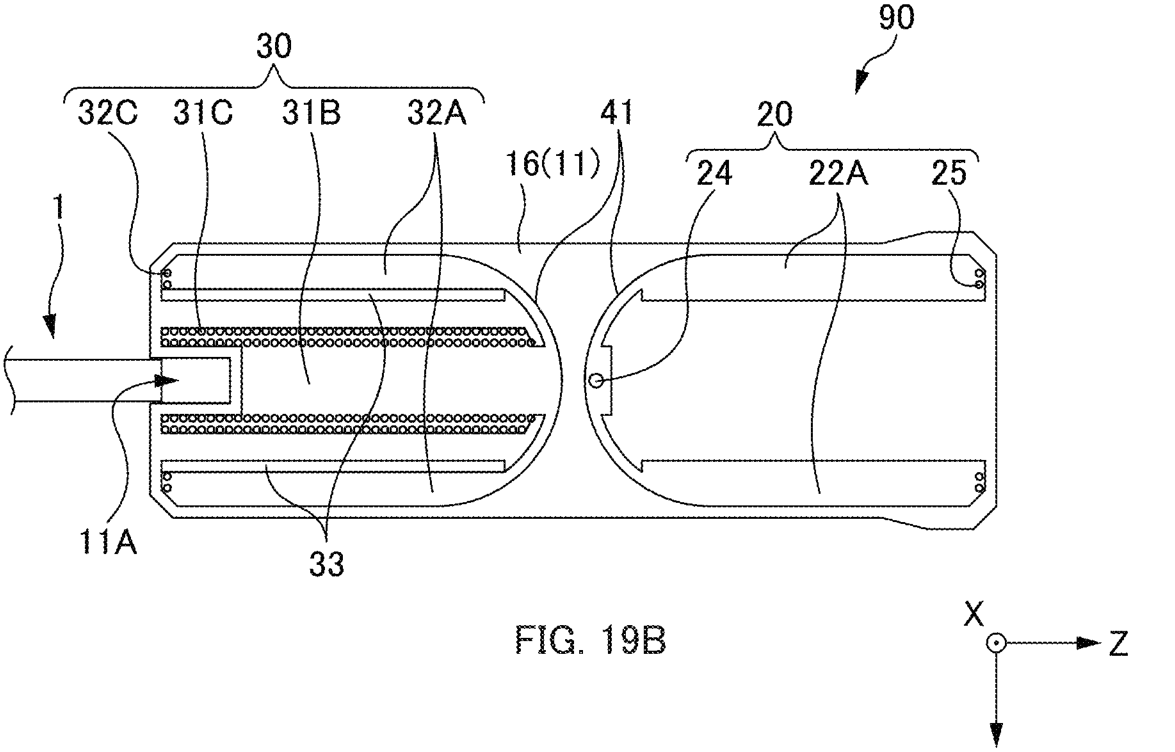

FIG. 19 is a plan view of the antenna 90 according to the first modified example of this embodiment. FIG. 19A is a view of a front surface side of the antenna 90. FIG. 19B is a view of a back surface side of the antenna 90.

A first extending portion 22 has a main body portion 22A, an additional portion 22B, and a through-hole 25.

The main body portion 22A is a portion of the first extending portion 22 formed in a second layer 14 of a substrate 11 (that is, a layer on the back surface side of the substrate 11).

The additional portion 22B is a portion additionally provided to the main body portion 22A to ensure an electrical length required for resonance in the radio wave frequency band supported by the antenna 10. The additional portion 22B is formed in a first layer 13 of the substrate 11 (that is, a layer on the front surface side of the substrate 11).

The through-hole 25 is a portion that connects the additional portion 22B formed in the first layer 13 of the substrate 11 to the main body portion 22A formed in the second layer 14 of the substrate 11. The through-hole 25 electrically connects the additional portion 22B to the main body portion 22A.

Thus, the antenna 90 of the first modified example has the same configuration as that of the antenna 80 except that the first extending portion 22 has the same outer shape as the second conductor part 30.

<<Antenna 100 of Second Modified Example>>

In the antennas 10 and 80 described above, the first extending portion 22 of the first conductor part 20 and the second extending portion 32 of the second conductor part 30 are positioned in the same second layer 14 of the substrate 11. However, the first and second extending portions 22 and 32 do not have to be positioned in the same layer. The first and second extending portions 22 and 32 may be positioned in different layers as in the case of an antenna 100 of a second modified example described below.

Figure 20A:
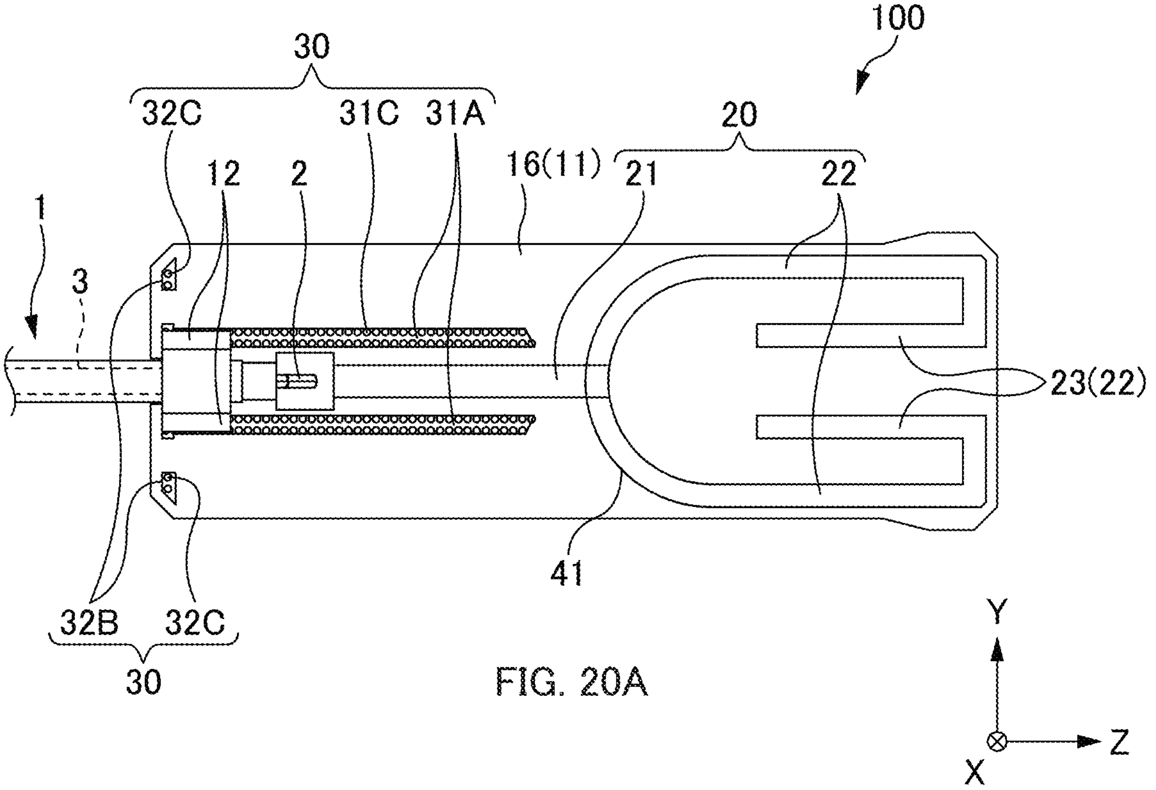
FIGS. 20A and 20B are plan views of an antenna 100 according to a second modified example of this embodiment, FIG. 20A illustrating a front surface side of the antenna 100 and FIG. 20B illustrating a back surface side of the antenna 100.
Figure 20B:
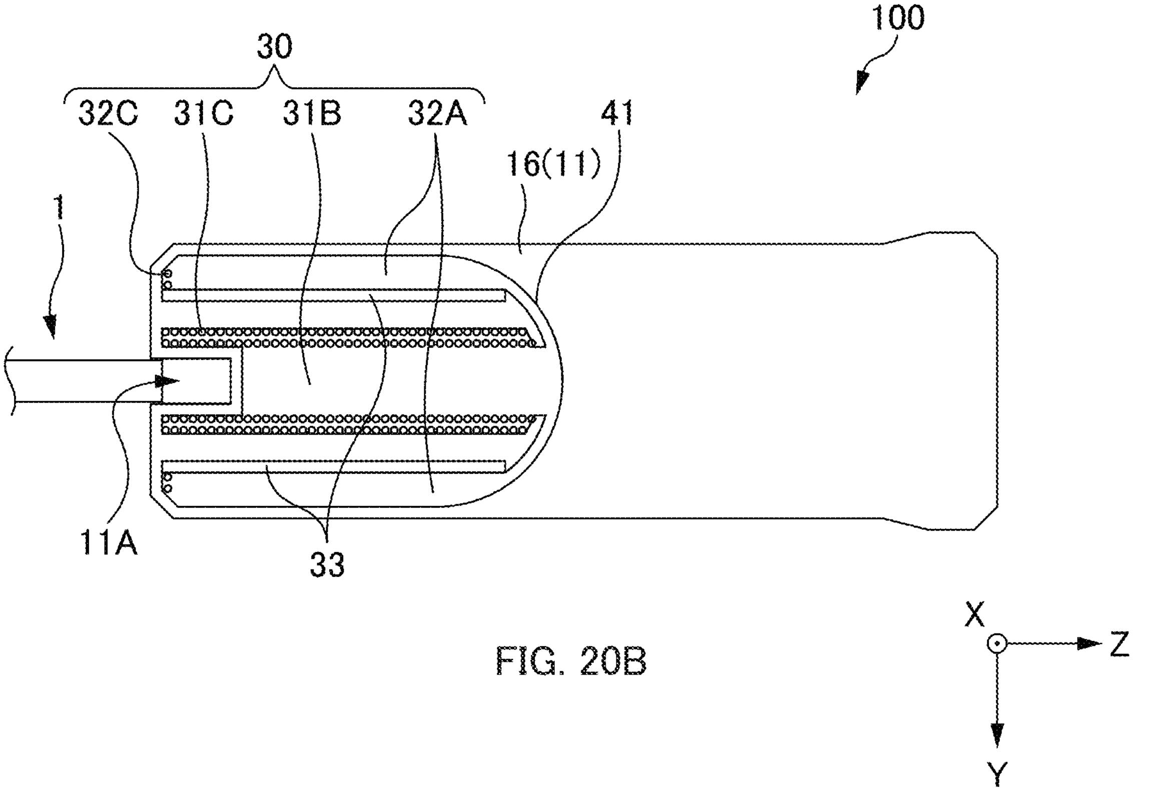

FIG. 20 is a plan view of the antenna 100 according to the second modified example of this embodiment. FIG. 20A is a view of the front surface side of the antenna 100. FIG. 20B is a view of the back surface side of the antenna 100.

In the antenna 100, the first extending portion 22 is formed in a first layer 13 of a substrate 11 (that is, a layer on the front surface side of the substrate 11). The first extending portion 22 has its end on the −Z direction side connected to a first line portion 21. Therefore, there is no through-hole 24.

Thus, the antenna 100 of the second modified example has the same configuration as the antenna 80 except that the first extending portion 22 of the first conductor part 20 is formed in the first layer 13 of the substrate 11 and there is no through-hole 24.

<<Antenna 110 of Third Modified Example>>

In the antennas 10 and 80 described above, the substrate 11 is a double-sided substrate (two-layer substrate) having conductor patterns formed on both sides of one dielectric layer 16. However, as in an antenna 110 of a third modified example described below, the substrate may be configured as a three-layer substrate by having another dielectric layer 17 besides the dielectric layer 16.

Figure 21:
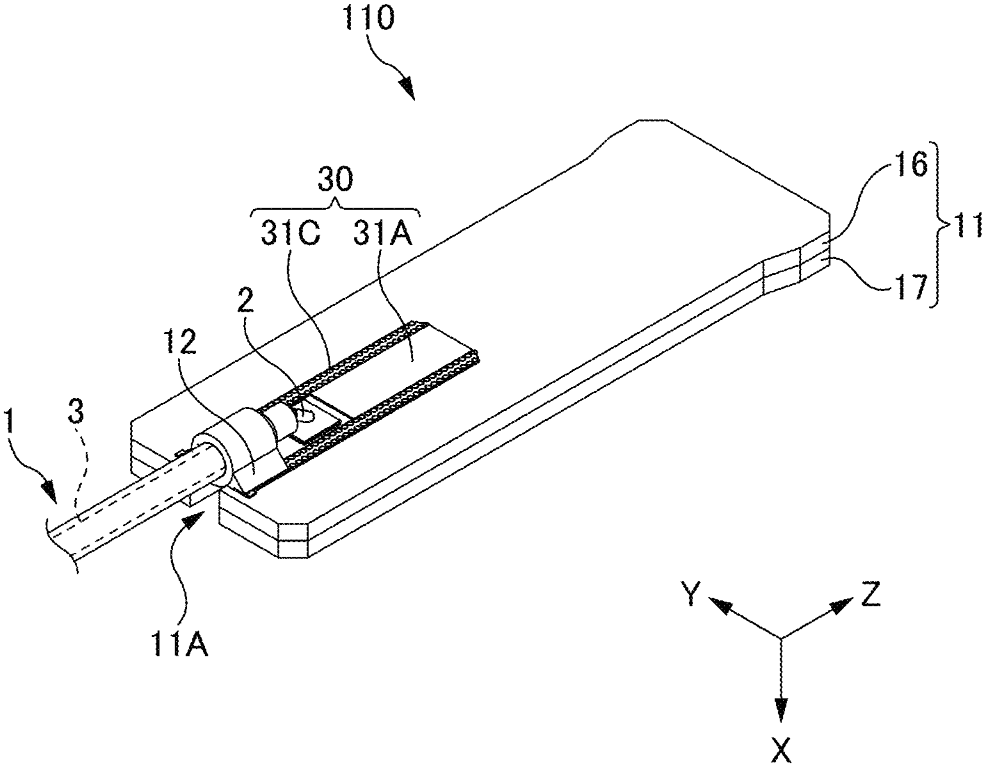
FIG. 21 is a perspective view of an antenna 110 according to a third modified example of this embodiment.
Figure 22:
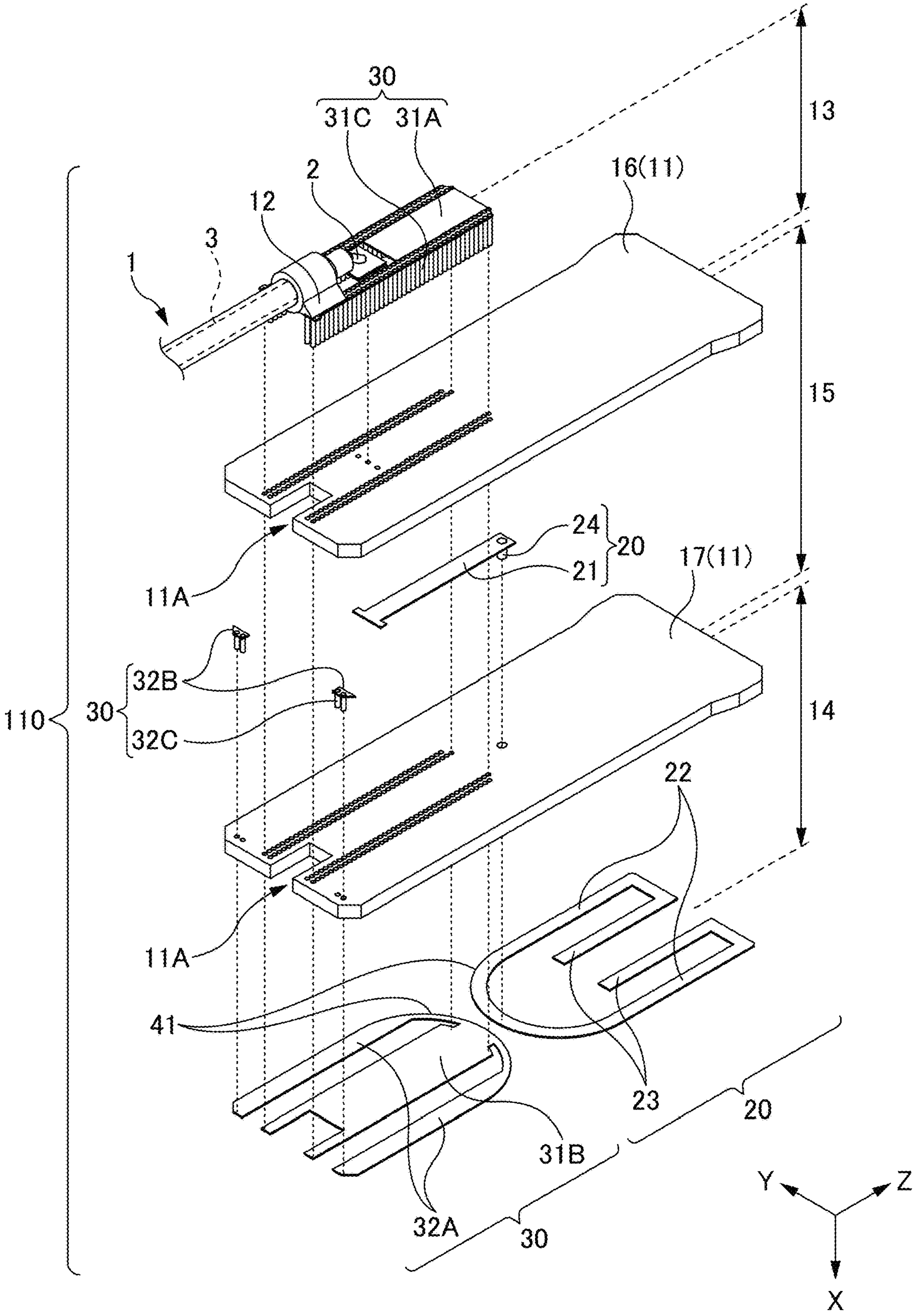
FIG. 22 is an exploded perspective view of the antenna 110.

FIG. 21 is a perspective view of the antenna 110 according to the third modified example of this embodiment. FIG. 22 is an exploded perspective view of the antenna 110.

In the antenna 110 of the third modified example, as illustrated in FIGS. 21 and 22, a substrate 11 includes a dielectric layer 16 and a cable connecting portion 12, and also includes a dielectric layer 17 different from the dielectric layer 16. That is, the substrate 11 is configured as a three-layer substrate.

Hereinafter, a layer between the dielectric layers 16 and 17 may be referred to as a "third layer 15" as illustrated in FIG. 22.

In the antenna 110 of the third modified example, a first line portion 21 and an additional portion 32B of a second extending portion 32 are formed in the third layer 15. The configuration of the antenna 110 of the third modified example is otherwise the same as the configuration of the antenna 80.

Figure 23A:
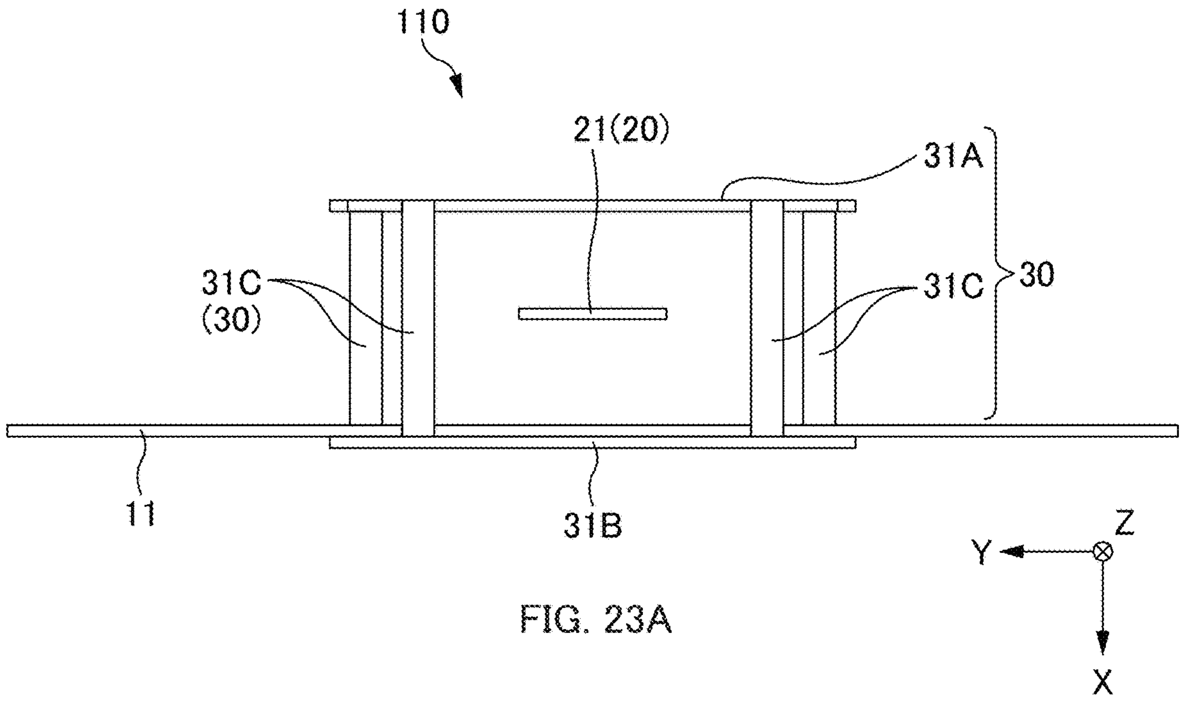
FIG. 23A is a cross-sectional view of the line portion of the antenna 110 and FIG. 23B is a schematic cross-sectional view of the line portion of the antenna 110.
Figure 23B:
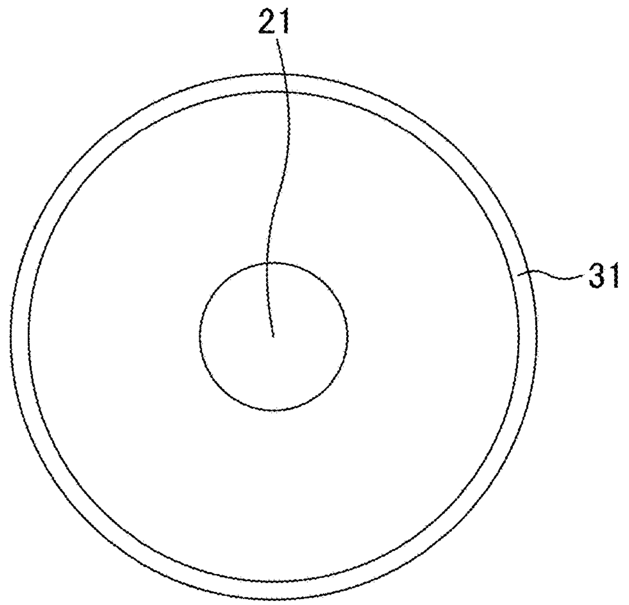

FIG. 23 is a diagram of the line portion of the antenna 110. FIG. 23A is a cross-sectional view of the line portion of the antenna 110. FIG. 23B is a schematic cross-sectional view of the line portion of the antenna 110.

As illustrated in FIG. 23A, the line portion of the antenna 110 of the third modified example has a structure similar to a microstrip line, including a back surface side second line portion 31B connected to a ground wire 3 and a first line portion 21 connected to a signal wire 2. The line portion of the antenna 110 of the third modified example further includes a through-hole 31C as a conductor that functions as a ground on the side surface. Thus, in the antenna 110 of the third modified example, as illustrated in FIG. 23B, the first line portion 21 connected to the signal wire 2 and the second line portion 31 connected to the ground wire 3 have a coaxial structure, and the entire structure is configured.

The antenna 10 illustrated in FIG. 10B has a shape in which half of the coaxial structure is configured, whereas the antenna 110 of the third modified example has a shape in which the entire coaxial structure is configured. Therefore, the antenna 110 of the third modified example has a superior function as the line portion compared to the antenna 10.

==Summary==

The antennas 10, 80, 90, 100, and 110 according to the embodiments of the present disclosure have been described above.

The antennas 10, 80, 90, 100, and 110 according to this embodiment each include the substrate 11 and the first and second conductor parts 20 and 30 formed on the substrate 11, as illustrated in FIGS. 1, 2, 14, 19, and 20 to 22, for example. The first conductor part 20 is connected to the signal wire 2, the second conductor part 30 is connected to the ground wire 3, and the first and second conductor parts 20 and 30 operate as a sleeve dipole antenna. Thus, the antenna can be made smaller and thinner, and a leakage current can be suppressed.

The antennas 10, 80, 90, 100, and 110 according to these embodiments each further include the cable connecting portion 12 to which the coaxial cable 1 is connected, as illustrated in FIGS. 1, 2, 14, 19, and 20 to 22, for example. The cable connecting portion 12 is provided at the end portion of the substrate 11. Thus, the antenna can be made smaller and thinner, and the leakage current can be suppressed.

In the antennas 10, 80, 90, 100, and 110 according to these embodiments, the notch portion 11A is formed in the substrate 11 and the cable connecting portion 12 is positioned in the notch portion 11A as illustrated in FIGS. 1, 2, 14, 19, and 20 to 22, for example. Thus, the coaxial cable 1 can be easily connected to the substrate 11, and the antenna can be made smaller.

In the antennas 10, 80, 90, 100, and 110 according to these embodiments, the first layer 13 of the substrate 11 in which the cable connecting portion 12 is positioned is different from the second layer 14 of the substrate 11 in which at least part of the second conductor part 30 (for example, the main body portion 32A of the second extending portion 32) is positioned, as illustrated in FIGS. 1, 2, 14, 19, and 20 to 22, for example. Thus, the substrate 11 can be made smaller and the VSWR characteristics can be improved.

In the antennas 10, 80, 90, 100, and 110 according to these embodiments, the second conductor part 30 is provided so as to extend from one second layer 14 of the substrate 11 to another first layer 13 as illustrated in FIGS. 1, 2, 14, 19, and 20 to 22, for example. Thus, the electrical length required for the antenna to resonate can be ensured.

In the antennas 10, 80, 90, and 110 according to these embodiments, at least part of the first conductor part 20 (for example, the first extending portion 22) and at least part of the second conductor part 30 (for example, the second extending portion 32) are positioned in the same second layer 14 of the substrate 11 as illustrated in FIGS. 1, 2, 14, 19, 21, and 22, for example. Thus, it is possible to realize an antenna that supports a wide band.

In the antennas 10, 80, 90, and 110 according to these embodiments, the first and second conductor parts 20 and 30 have the self-similar shape portion 41 in a predetermined region where the first and second conductor parts 20 and 30 positioned in the same second layer 14 face each other, as illustrated in FIGS. 1, 2, 14, 19, 21, and 22, for example. Thus, it is possible to realize an antenna that supports a wide band.

In the antennas 10, 80, 90, 100, and 110 according to these embodiments, the substrate 11 has the cable connecting portion 12 to which the coaxial cable 1 is connected, and the second conductor part 30 includes the back surface side second line portion 31B provided between the cable connecting portion 12 and the feeding portion 40 and a pair of second extending portions 32 (main body portion 32A) that extend from the feeding portion 40 and are positioned so as to sandwich the back surface side second line portion 31B, as illustrated in FIGS. 1, 2, 14, 19, and 20 to 22, for example. Thus, the antenna can be made smaller and the leakage current can be suppressed.

Embodiments of the present disclosure described above are simply to facilitate an understanding of the present disclosure and are not in any way to be construed as limiting the present disclosure. The present disclosure may variously be changed or altered without departing from its essential features and encompass equivalents thereof.

1 coaxial cable
2 signal wire
3 ground wire
10, 50, 60, 70, 80, 90, 100, 110 antenna
11 substrate
11A notch
12 cable connecting portion
13 first layer
14 second layer
15 third layer
16, 17 dielectric layer
20 first conductor part
21 first line portion
22 first extension part
23 bent portion
24, 25, 31C, 32C through-hole
30 second conductor part
31 second line portion
31A front surface side second line portion
31B back surface side second line portion
32 second extending portion
22A, 32A main body portion
22B, 32B additional portion
33 adjusting portion
40 feeding portion
41 self-similar shape portion
51, 61 first element
52, 62 second element
71 Spertopf part

The invention claimed is:

1. An antenna comprising:
a substrate; and
a first conductor part and a second conductor part formed on the substrate, wherein
the first conductor part has a first sleeve and is connected to a signal wire,
the second conductor part has a second sleeve and is connected to a ground wire, and
the first conductor part and the second conductor part operate as a sleeve dipole antenna,
wherein
the substrate has a first side and a second side opposite to the first side,
the first conductor part has a first portion on the first side of the substrate and a second portion on the second side of the substrate, the first portion of the first conductor part being connected to the second portion of the first conductor part via one or more first connections through the substrate,
the second conductor part has a first portion on the first side of the substrate and a second portion on the second side of the substrate, the first portion of the second conductor part being connected to the second portion of the second conductor part via one or more second connections through the substrate, and
the second portion of the first conductor part has a first predetermined shape and the second portion of the second conductor part has a second predetermined shape, wherein outer portions of the first and second predetermined shapes are mirror images of each other.

2. The antenna according to claim 1, further comprising:
a cable connecting portion to which a coaxial cable is connected, wherein
the cable connecting portion is provided at an end of the substrate.

3. The antenna according to claim 2, wherein
the substrate has a notch portion, and
the cable connecting portion is positioned in the notch portion.

4. The antenna according to claim 2, wherein a layer of the substrate in which the cable connecting portion is positioned is different from a layer of the substrate in which at least part of the second conductor part is positioned.

5. The antenna according to claim 1, wherein at least part of the first conductor part and at least part of the second conductor part are positioned in the same layer of the substrate.

6. An antenna comprising:

a substrate; and a first conductor part and a second conductor part formed on the substrate, wherein the first conductor part has a first sleeve and is connected to a signal wire, the second conductor part has a second sleeve and is connected to a ground wire, and the first conductor part and the second conductor part operate as a sleeve dipole antenna, wherein the substrate has a cable connecting portion to which a coaxial cable is connected, and the second conductor part includes a line portion provided between the cable connecting portion and a feeding portion and a pair of extending portions that extend from the feeding portion and are positioned so as to sandwich the line portion.

* * * * *